United States Patent
Berger et al.

(10) Patent No.: US 6,304,841 B1
(45) Date of Patent: Oct. 16, 2001

(54) AUTOMATIC CONSTRUCTION OF CONDITIONAL EXPONENTIAL MODELS FROM ELEMENTARY FEATURES

(75) Inventors: Adam Lee Berger; Peter Fitzhugh Brown, both of New York; Stephen Andrew Della Pietra, Valley Cottage; Vincent Joseph Della Pietra, Blauvelt, all of NY (US); John David Lafferty, Pittsburgh, PA (US); Robert Leroy Mercer, Mt. Sinai, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/902,177

(22) Filed: Jul. 29, 1997

Related U.S. Application Data

(63) Continuation of application No. 08/431,597, filed on May 1, 1995, now abandoned, which is a continuation-in-part of application No. 08/144,913, filed on Oct. 28, 1993, now Pat. No. 5,510,981.

(51) Int. Cl.[7] ..................................................... G06F 17/27
(52) U.S. Cl. ..................................................... 704/2; 705/1
(58) Field of Search .................................. 705/1–10, 257; 704/2, 9

(56) References Cited

U.S. PATENT DOCUMENTS

| | | | |
|---|---|---|---|
| 4,974,191 | * | 11/1990 | Amirghodsi et al. . |
| 5,510,981 | * | 4/1996 | Berger et al. . |

FOREIGN PATENT DOCUMENTS

| | | | |
|---|---|---|---|
| 0 525 470 A2 | 2/1993 | (EP) | ................................ G06F/15/38 |
| 0 568 319 A2 | 11/1993 | (EP) | ................................ G06F/15/38 |

OTHER PUBLICATIONS

David T. Brown, "A Note on Approximations to Discrete Probability Distributions", Information and Control, vol. 2, pp. 386–392 (1959).

Brown et al., "The Mathematics of Statistical Machine Translation: Parameter Estimation", Computational Linguistics, vol. 19, No.2, pp. 263–311.

(List continued on next page.)

*Primary Examiner*—Frantzy Poinvil
(74) *Attorney, Agent, or Firm*—F. Chau & Associates, LLP

(57) ABSTRACT

An apparatus for translating a series of source words in a first language to a series of target words in a second language. For an input series of source words, at least two target hypotheses, each comprising a series of target words, are generated. Each target word has a context comprising at least one other word in the target hypothesis. For each target hypothesis, a language model match score comprises an estimate of the probability of occurrence of the series of words in the target hypothesis. At least one alignment connecting each source word with at least one target word in the target hypothesis is identified. For each source word and each target hypothesis, a word match score comprises an estimate of the conditional probability of occurrence of the source word, given the target word in the target hypothesis which is connected to the source word and given the context in the target hypothesis of the target word which is connected to the source word. For each target hypothesis, a translation match score comprises a combination of the word match scores for the target hypothesis and the source words in the input series of source words.

10 Claims, 19 Drawing Sheets

OTHER PUBLICATIONS

I. Csiszar, "I–Divergence Geometry of Probability Distributions and Minimization Problems", The Annals of Probability, 1975, vol. 3, No. 1, pp. 146–158.

J.N. Darroch et al., "Generalized Iterative Scaling for Log-Linear Models", The Annals of Mathematical Statistics, 1972, vol. 43, No. 5, pp. 1470–1480.

I. Csiszar, "A Geometric Interpretation of Darroch and Ratcliff s Generalized Iterative Scaling", The Annals of Statistics, 1989, vol. 17, No. 3, pp. 1409–1412.

Eurospeech 89, European Conference on Speech Communication and Technology, "A Massively Parallel Model of Speech–To–Speech Dialog Translation: A Step Toward Interpreting Telephony" by H. Kitano et al., Center for Machine Translation, Carnegie Mellon University, Pennsylvania, vol. 1, pp. 198–201. Editors: J.P. Tubach, et al. (Sep. 1989).

Research Report, A Maximm Entropy Approach to Natural Language Processing, Adam L. Berger, et al., IBM Research Division, Yorktown Heights, NY, Aug. 5, 1994.

* cited by examiner

FIG. 5

Je dirais même que les chances sont supérieures a 50%.

I would even say that the odds are greater than 50%.

Il semble que Bank of Boston ait pratiquement achevé son réexamen de Shawmut.

It appears that Bank of Boston has almost completed its review of Shawmut.

*Monsier l'Orateur,*

*j'aimerais poser une question au*

*Ministre des Transports.*

*A quelle date le*

*nouveau reglement devrait il entrer en vigeur?*

*Quels furent les crit'eres utilisés*

*pour l'évaluation*

*de ces biens.*

*Nous*

*savons que si nous pouvions contrôler la folle avoine*

*dans l'ouest du Canada, en*

*un an nous*

*augmenterions notre rendement en*

*céréales de 1 milliard de dollars.*

FIG. 10

$$f_1(x,y) = \begin{cases} 1 & y=en \text{ and } April \in \square\square\square\boxdot\square\square \\ 0 & \text{otherwise} \end{cases}$$

FIG. 23

$$f_2(x,y) = \begin{cases} pendant \text{ and } weeks \in \square\square\square\boxdot\boxdot\boxdot \\ 0 \text{ otherwise} \end{cases}$$

FIG. 24

| Template Number | Number of actual features | $f(x,y)=1$ if and only if... |
|---|---|---|
| 1 | $\|\mathcal{V}_F\|$ | $y=\diamond$ |
| 2 | $\|\mathcal{V}_F\| \cdot \|\mathcal{V}_E\|$ | $y=\diamond$ and $\square \in $ [ ][ ][ ][ ][·][ ][ ] |
| 3 | $\|\mathcal{V}_F\| \cdot \|\mathcal{V}_E\|$ | $y=\diamond$ and $\square \in $ [ ][ ][ ][·][ ][ ][ ] |
| 4 | $\|\mathcal{V}_F\| \cdot \|\mathcal{V}_E\|$ | $y=\diamond$ and $\square \in $ [·][·][·][ ][ ][ ][ ] |
| 5 | $\|\mathcal{V}_F\| \cdot \|\mathcal{V}_E\|$ | $y=\diamond$ and $\square \in $ [ ][ ][ ][ ][·][·][·] |

Table 3

FIG. 25

| Feature $f((x,y))$ | $\sim\Delta L(f)$ | $L(p,\bar{p})$ |
|---|---|---|
| $y=épuiser$ and $out \in$ [ ][ ][ ][ ][·][·][·] | 0.0252 | -4.8499 |
| $y=manquer$ and $out \in$ [ ][ ][ ][ ][·][·][·] | 0.0221 | -4.8201 |
| $y=écouler$ and $time \in$ [ ][ ][ ][ ][·][·][·] | 0.0157 | -4.7969 |
| $y=accumuler$ and $up \in$ [ ][ ][ ][·][ ][ ][ ] | 0.0149 | -4.7771 |
| $y=nous$ and $we \in$ [ ][·][ ][ ][ ][ ][ ] | 0.0140 | -4.7582 |
| $y=aller$ and $counter \in$ [ ][ ][ ][ ][·][·][·] | 0.0131 | -4.7445 |
| $y=candidat$ and $for \in$ [ ][ ][ ][ ][·][·][·] | 0.0124 | -4.7295 |
| $y=diriger$ and $the \in$ [ ][ ][ ][ ][·][·][·] | 0.0123 | -4.7146 |

Table 5

FIG. 26

| Feature $f((x,y))$ | $\sim\Delta L(f)$ | $L(p,\bar{p})$ |
|---|---|---|
| $y=\grave{a}$ and *Canada* ∈ ▢▢▢▢·▢▢ | 0.041581 | -2.9674 |
| $y=\grave{a}$ and *House* ∈ ▢▢▢▢·▢▢ | 0.036177 | -2.9281 |
| $y=en$ and *the* ∈ ▢▢▢▢·▢▢ | 0.022113 | -2.8944 |
| $y=pour$ and *order* ∈ ▢▢▢▢·▢▢ | 0.022441 | -2.8703 |
| $y=dans$ and *speech* ∈ ▢▢▢▢·▢·▢· | 0.019059 | -2.8525 |
| $y=dans$ and *area* ∈ ▢▢▢▢·▢·▢· | 0.015329 | -2.8377 |
| $y=de$ and *increase* ∈ ·▢·▢·▢▢▢▢ | 0.015196 | -2.8209 |
| $y=[verb\ marker]$ and *my* ∈ ▢▢▢▢·▢▢ | 0.014162 | -2.8034 |
| $y=dans$ and *case* ∈ ▢▢▢▢·▢·▢· | 0.011694 | -2.7918 |
| $y=au\ cours\ de$ and *year* ∈ ▢▢▢▢·▢·▢· | 0.010489 | -2.7792 |

Table 4

FIG. 27

AUTOMATIC CONSTRUCTION OF CONDITIONAL EXPONENTIAL MODELS FROM ELEMENTARY FEATURES

This invention is a continuation of U.S. patent application Ser. No. 08/431,597 filed May 1, 1995 now abandoned, which is a continuation-in-part of U.S. patent application Ser. No. 08/144,913, filed Oct. 28, 1993, now U.S. Pat. No. 5,510,981, issued Apr. 23, 1996.

This invention was made with Government support under Contract No. N00014-91-C-0135 awarded by the Office of Naval Research. The Government has certain rights in this invention.

BACKGROUND OF THE INVENTION

The invention relates to computerized language translation, such as computerized translation of a French sentence into an English sentence.

In U.S. Pat. No. 5,477,451, issued Dec. 19, 1995 entitled "Method and System For Natural Language Translation" by Peter F. Brown et al. (the entire content of which is incorporated herein by reference), there is described a computerized language translation system for translating a text F in a source language to a text E in a target language. The system described therein evaluates, for each a number of hypothesized target language texts E, the conditional probability $P(E|F)$ of the target language text E given the source language text F. The hypothesized target language text E having the highest conditional-probability $P(E|F)$ is selected as the translation of the source language text F.

Using Bayes' theorem, the conditional probability $P(E|F)$ of the target language text E given the source language text F can be written as $$P(E\mid F) = \frac{P(F\mid E)P(E)}{P(F)} \tag{1a}$$

Since the probability $P(F)$ of the source language text F in the denominator of Equation 1a is independent of the target language text $\hat{E}$, the target language text E having the highest conditional probability $P(E|F)$ will also have the highest product $P(F|E)\ P(E)$. We therefore arrive at $$\hat{E} = \underset{E}{\mathrm{argmax}} P(F\mid E)P(E) \tag{2a}$$

In Equation 2a, the probability $P(E)$ of the target language text E is a language model match score and may be estimated from a target language model. While any known language model may be used to estimate the probability $P(E)$ of the target language text E, Brown et al. describe an n-gram language model comprising a 1-gram model, a 2-gram model, send a 3-gram model combined by parameters whose values are obtained by interpolated estimation.

The conditional probability $P(F|E)$ in Equation 2a is a translation match score. As described by Brown et al., the translation match score $P(F|E)$ for a source text F comprising a series of source words, given a target hypothesis E comprising a series of target words, may be estimated by finding all possible alignments connecting the source words in the source text F, with the target words in the target text E, including alignments in which one or more source words are not connected to any target words, but not including alignments where a source word is connected to more than one target word. For each alignment and each target word e in the target text E connected to $\phi$ source words in the source text F, there is estimated the fertility probability $n(\phi|e)$ that the target word e is connected to the $\phi$ source words in the alignment. There is also estimated for each source word f in the source text F and each target word e in the target text E connected to the source word f by the alignment, the lexical probability $t(f|e)$ that the source word f would occur given the occurrence of the connected target word e.

For each alignment and each source word f, Brown et al. further estimate the distortion probability $a(j|a_j, m)$ that the source word f is located in position j of the source text F, given that the target word e connected to the source word f is located in position $a_j$ in the target text E, and given that there are m words in the source text F.

By combining the fertility probabilities for an alignment and for all target words e in the target text E, and multiplying the result by the probability $n_o(\phi_o|\Sigma\phi_i)$ of the number $\phi_o$ of target words not connected with any source words in the alignment, given the sum of the fertilities $\phi$ of all of the target words in the target text E in the alignment, a fertility score for the target text E and the alignment is obtained.

By combining the lexical probabilities for an alignment and for all source words in the source text F, a lexical score for the alignment is obtained.

By combining the distortion probabilities for an alignment and for all source words in the source text F which are connected to a target word in the alignment, and by multiplying the result by $1/\phi_o!$ (where $\phi_0$ is the number of target words in the target text E that are not connected with any source words), a distortion score for the alignment is obtained.

Finally, by combining the fertility, lexical, and distortion scores for the alignment, and multiplying the result by the combinatorial factor $\|(\phi_i!)$, a translation match score for the alignment is obtained. (See Brown, et al., Section 8.2).

The translation match score $P(F|E)$ for the source text F and the target hypothesis E may be the sum of the translation match scores for all permitted alignments between the source text F and the target hypothesis E. Preferably, the translation match score $P(F|E)$ for the source text F and the target hypothesis E is the translation match score for the alignment estimated to be most probable.

Equation 2a may be used to directly estimate the target hypothesis match score $P(F|E)P(E)$ for a hypothesized target language text E and a source language text F. However, in order to simplify the language model $P(E)$ and the translation model $P(F|E)$, and in order to estimate the parameters of these models from a manageable amount of training data, Brown et al. estimate the target hypothesis match score $P(F|E)P(E)$ for simplified intermediate forms E' and F' of the target language text E and the source language text F, respectively. Each intermediate target language word e' represents a class of related target language words. Each intermediate source language word f' represents a class of related source language words. A source language transducer converts the source language text F to the intermediate form F'. The hypothesized intermediate form target language text $\hat{E}$' having the highest hypothesis match score $P(F'|E')P(E')$ is estimated from Equation 2a. A target language transducer converts the best matched intermediate target language text $\hat{E}$' to the target language text $\hat{E}$.

In their language translation system, Brown et al. estimate the lexical probability of each source word f as the conditional probability $t(f|e)$ of each source word f given solely the target words e connected to the source word in an alignment. Consequently, the lexical probability provides only a coarse estimate of the probability of the source word f.

STATISTICAL MODELLING

Statistical modelling addresses the problem of constructing a parameterized model to predict the future behavior of a random process. In constructing this model, we typically have at our disposal a sample of an output from the process. This sample output embodies our incomplete state of knowledge of the process; so the modelling problem is to parlay this incomplete knowledge into an accurate representation of the process. Statistical modelling is rarely an end in itself, but rather a tool to aid in decision-making.

Baseball managers (who rank among the better paid statistical modellers) employ batting average, compiled from a history of at-bats, to gauge the likelihood that a player will succeed in his next appearance at the plate. Thus informed, they manipulate their lineups accordingly. Wall Street speculators (who rank among the best paid statistical modellers) build models based on past stock price movements to predict tomorrow's fluctuations and alter their portfolios to capitalize on the predicted future. Natural language researchers, who reside at the other end of the pay scale, design language, translation and acoustic models for use in speech recognition, machine translation and natural language processing.

The past few decades have witnessed significant progress toward increasing the predictive capacity of statistical models of natural language.

These efforts, while varied in specifics, all confront two essential tasks of statistical modelling. The first task is to determine a set of statistics which capture the behavior of a random process. If the process is a sequence of words uttered by a speaker, one informative statistic is the average number of words in the speaker's sentences. Another statistic is the percentage of words that are adjectives. A third statistic is the number of times the speaker uses each different word. Given a set of statistics representing a collection of facts about the process, the second task is to corral these facts into an accurate model of the process—a model capable of predicting the future output of the process. The first task is one of feature selection; the second is one of model selection. In the following pages, we present a unified approach to these two tasks based in the maximum entropy philosophy.

SUMMARY OF THE INVENTION

The invention is a method for adjusting a model used in a language translation, comprising the steps of: a) providing a set of candidate features exhibited in the output of the process; b) providing a sample of data representing the output of the process being modeled; c) choosing an initial model of the process; d) initializing an active set S of features contained in the model; e) computing a score representing the benefit of adding the feature to the model for all features; f) selecting one or more features with the highest scores; g) if none of the scores is sufficiently high, stop; h) adding selected features to the set S of active features; i) computing a model Ps containing the features in S; and j) repeating steps (e)–(i) until the stop condition of step (g) is satisfied.

BRIEF DESCRIPTION OF THE DRAWINGS

FIG. 5 illustrates improved translations of the sentences of FIG. 4.

FIG. 10 illustrates maximum entropy segmenter behavior on four sentences.

FIG. 23 illustrates a first indicator function.

FIG. 24 illustrates a second indicator function.

FIG. 25 illustrates a table of feature templates for word-translation modelling.

FIG. 26 illustrates a first table of features of a maximum entropy model.

FIG. 27 illustrates a second table of features of a maximum entropy model.

DESCRIPTION OF THE PREFERRED EMBODIMENT

Figure 11:
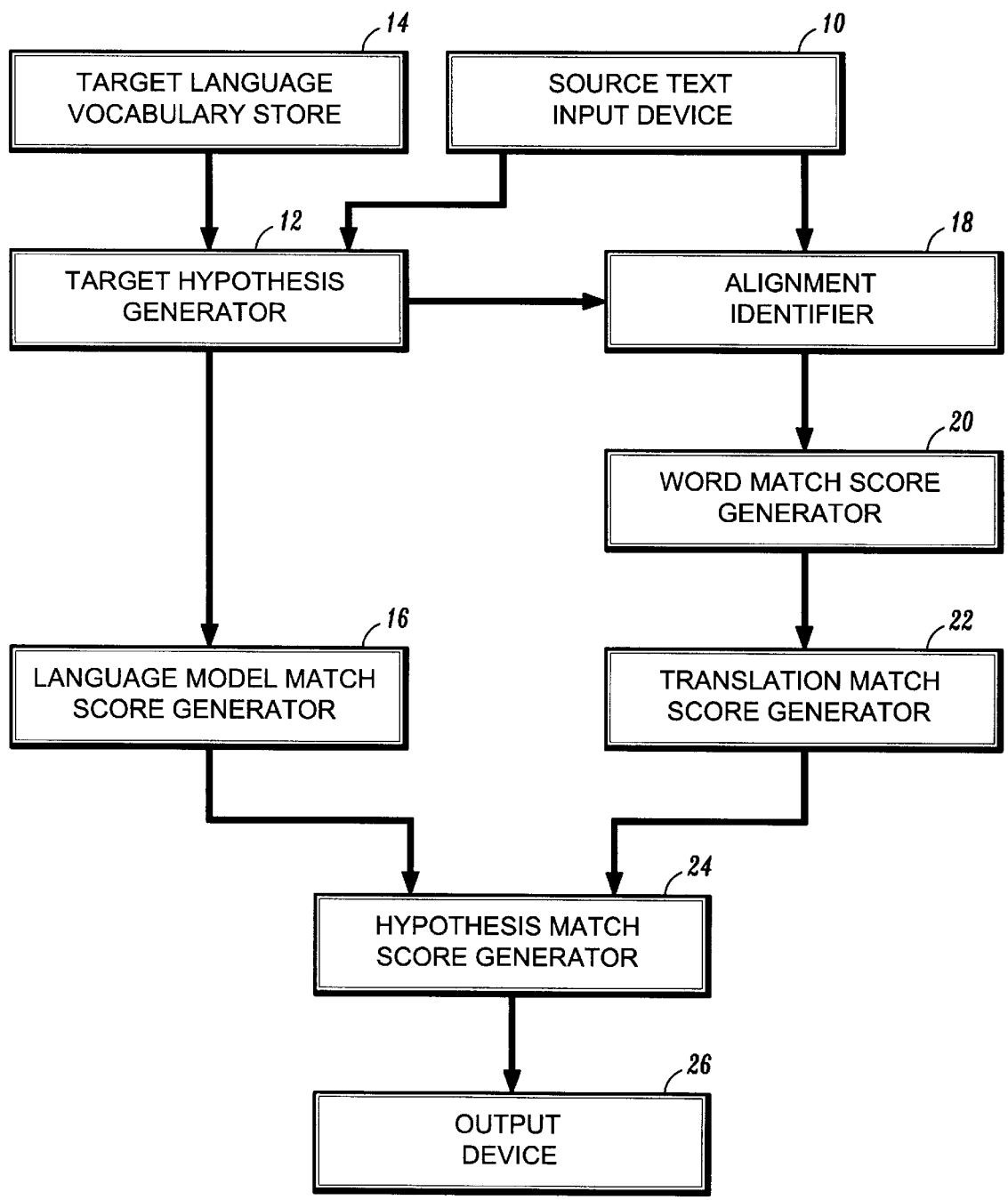
FIG. 11 is a block diagram of an example of an apparatus for translating words from a first language to a second language according to the present invention.

FIG. 11 is a block diagram of an example of an apparatus for translating words from a first language to a second language according to the present invention. The apparatus comprises a source text input device 10 for inputting a series of source words. The source text input device 10 may comprise, for example, a keyboard, a computer disk drive, or a computer tape drive.

The source text input device 10 may further comprise means for transforming the input series of source words into a series of transformed source words. Each transformed source word may represent a set of related input source words. For example, each of the input source words in the set {etre, etant, ete, suis, es, est, sommes, etes, sont, fus, fumes, serai, serons, sois, soit, soyons, soyez, soient} are forms of the verb infinitive "etre", and may be transformed to "etre" with a tag representing the tense of the original input source word.

The means for transforming the input series of source words into a series of transformed source words may comprise the source transducers described in Sections 3, 4, and 11 of Brown et al., above, which are incorporated herein by reference. In essence, these transducers check and correct the spelling of the input source words, check and correct the case of the input source words, detect titles of documents in the input series of source words, and detect names in the input series of source words. The transducers also tag each input source word with the most likely part of speech of the source word, and flag unknown source words (which are not contained in a stored vocabulary of source words). The means for transforming the input series of source words also collapses multi-word units of input source words into single transformed source words, and splits compound input source words into two or more transformed source words. The means for transforming the input series of source words into a series of transformed source words further performs linguistic or morphological transformations of different forms of a word into a single basic form. Finally, the means for transforming the input series of source words may also estimate the sense of each input source word, and assign that sense to the transformed source word. Table 1a shows a hypothetical example of an input series of source words according to the invention. In this example, the source words are French words.

TABLE 1a

| Input Series of Source Words, F | | | | | | |
|---|---|---|---|---|---|---|
| $f_1$ | $f_2$ | $f_3$ | $f_4$ | $f_5$ | $f_6$ | |
| La | clef | est | dans | la | porte | — |

The translation apparatus according to the present invention further comprises a target hypothesis generator 12. The target hypothesis generator 12 generates at least two target hypotheses. Each target hypothesis comprises a series of target words selected from a vocabulary of words in the second language. The vocabulary of words in the second language may be stored in a target language vocabulary store 14. Each target word in a target hypothesis has a context comprising at least one other word in the target hypothesis.

An example of a target hypothesis generator is described in Section 14 of Brown et al., cited above, which is incorporated herein by reference.

Table 2a shows a hypothetical example of target hypotheses $E_1$, $E_2$, and $E_3$. In this example, the target words are English language words.

TABLE 2a

| TARGET HYPOTHESES $E_h$ | | | | | | |
|---|---|---|---|---|---|---|
| $E_h$ | $e_{h.1}$ | $e_{h.2}$ | $e_{h.3}$ | $e_{h.4}$ | $e_{h.5}$ | $e_{h.6}$ |
| $E_1$ | The | key | is | in | the | door | — |
| $E_2$ | The | key | is | in | the | gate | — |
| $E_3$ | The | wrench | is | in | the | door | — |

Preferably, each target hypothesis comprises a series of target words selected from a vocabulary comprising words in the second language, and a null word representing the absence of a word. In Table 2a all of the target hypotheses $E_h$ will be considered to include the "null" word.

Returning to FIG. 11, the translation apparatus comprises a language model match score generator 16 for generating, for each target hypothesis, a language model match score comprising an estimate of the probability of occurrence of the series of words in the target hypothesis. Sections 6 and 7 of Brown et al. cited above, describe an example of a language model match score generator, and are incorporated herein by reference. While any known language model may be used to estimate the probability of occurrence of the series of words in the target hypothesis, Brown et al. describe an n-gram language model comprising a 1-gram model, a 2-gram model, and a 3-gram model combined by parameters whose values are obtained by interpolated estimation.

The translation apparatus further comprises an alignment identifier 18 for identifying at least one alignment between the input series of source words and each target hypothesis. The alignment connects each source word with at least one target word in the target hypothesis.

Figure 12:
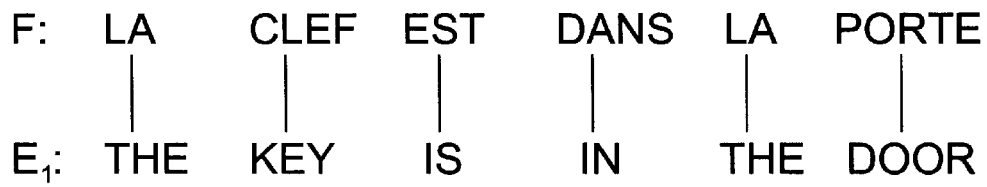
FIG. 12 schematically shows an example of an alignment between a hypothetical series of source words and a hypothetical series of target words.
Figure 13:
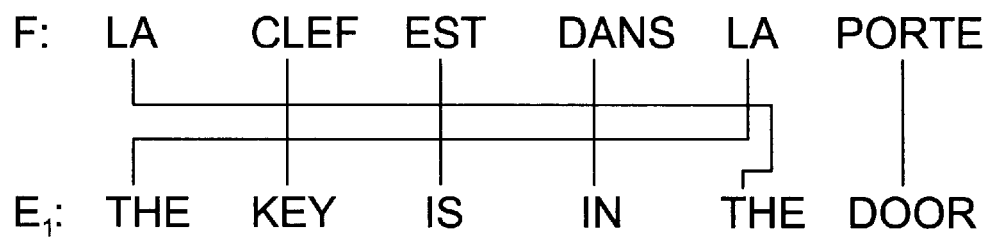
FIG. 13 schematically shows an example of a second alignment between the hypothetical series of source words and the hypothetical series of target words of FIG. 12.
Figure 14:
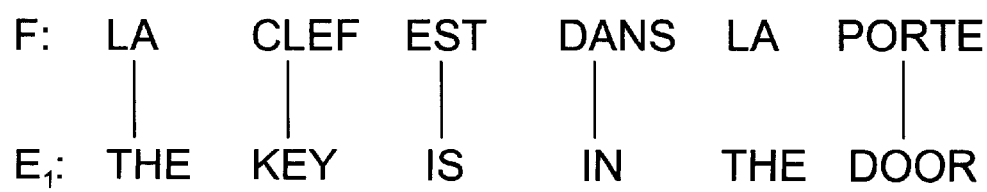
FIG. 14 schematically shows an example of a third alignment between the hypothetical series of source words and the hypothetical series of target words of FIG. 12.

FIGS. 12, 13, and 14 schematically show examples of possible alignments between the hypothetical input series of source words in Table 1a and the hypothetical input series of target words in target hypothesis $E_1$ in Table 2a. In each alignment, each source word in the input series of source words F is connected with at least one target word in the target hypothesis $E_1$ by a solid line. In the alignment of FIG. 14, the second occurrence of the source word "La" has no solid line therefrom, and is therefore considered to be connected to the "null" word.

Tables 3a, 4a, and 5a provide alternate descriptions of the alignments of FIGS. 12, 13, and 14, respectively.

TABLE 3a

| Alignment $A_{h.1}$ For Hypothesis $E_h$ (h = 1) and Source Words F | | | |
|---|---|---|---|
| j | $f_j$ | $a_j$ | $e_{a_j}$ |
| 1 | La | 1 | The |
| 2 | clef | 2 | key |
| 3 | est | 3 | is |
| 4 | dans | 4 | in |
| 5 | la | 5 | the |
| 6 | porte | 6 | door |

TABLE 4a

| Alignment $A_{h.2}$ For Hypothesis $E_h$ (h = 1) and Source Words F | | | |
|---|---|---|---|
| j | $f_j$ | $a_j$ | $e_{a_j}$ |
| 1 | La | 5 | the |
| 2 | clef | 2 | key |
| 3 | est | 3 | is |
| 4 | dans | 4 | in |
| 5 | la | 1 | The |
| 6 | porte | 6 | door |

TABLE 5a

Alignment $A_{h,2}$ For Hypothesis $E_h$
(h = 1) and Source Words F

| j | $f_j$ | $a_j$ | $e_{aj}$ |
|---|-------|-------|----------|
| 1 | La    | 1     | The      |
| 2 | clef  | 2     | key      |
| 3 | est   | 3     | is       |
| 4 | dans  | 4     | in       |
| 5 | la    | 0     | <null>   |
| 6 | porte | 6     | door     |

In each of Tables 3a, 4a and 5a, for each parameter j ranging from 1 to m (where m is the number of words in the input series of source words), there is another parameter $a_j$ having a single value in the range from 0 to L (where L is the number of words in the target hypothesis). For a given alignment, each word $f_j$ in the input series of source words is connected to the word $e_{aj}$ in the target hypothesis.

In general, there are $2^{Lm}$ possible alignments between a series of m source words and a series of L non-null target words, where each source word may be connected to either the null source word or one or more non-null target words. If each source word is constrained to be connected to only one null or non-null target word, then there are $m^{(L+1)}$ possible alignments.

Preferably, only one alignment between the input series of source words and each target hypothesis is identified for obtaining a word match score, described below, for each source word. The one identified alignment for the series of source words and each target hypothesis is preferably that which is produced by the target hypothesis generator 12, as described in Section 14 of Brown et al., cited above, which is incorporated herein by reference.

If the source text input device 10 comprises means for transforming the input series of source words into a series of transformed source words, then the alignment identifier 18 identifies at least one alignment between the series of transformed source words and each target hypothesis. The alignment connects each transformed source word with at least one target word in the target hypothesis.

Returning to FIG. 11, the translation apparatus further comprises a word match score generator 20. The word match score generator 20 generates, for each source word and each target hypothesis, a word match score comprising an estimate of the conditional probability P(f|e, X) of occurrence of the source word f, given the target word e in the target hypothesis which is connected to the source word f and given the context X of the target word e in the target hypothesis which is connected to the source word f.

Table 6a illustrates a hypothetical example of the context X of each target word $e_{aj}$ in the target hypothesis $E_1$ of Table 2a for the alignment $A_{1,1}$ of Table 3a. with the input series of source words F of Table 1a.

TABLE 6A

Context X of Target Word $e_{aj}$ For Alignment $A_{1,1}$ $X = \{e_{(aj-3)}, e_{(aj-2)}, e_{(aj-1)}, e_{(aj+1)}, e_{(aj+2)}, e_{(aj+3)}\}$

| j | $f_j$ | $e_{aj}$ | $X_1$ | $X_2$ | $X_3$ | $X_4$ | $X_5$ | $X_6$ |
|---|-------|----------|-------|-------|-------|-------|-------|-------|
| 1 | La    | The      | <null>| <null>| <null>| key   | is    | in    |
| 2 | clef  | key      | <null>| <null>| The   | is    | in    | the   |

TABLE 6A-continued

Context X of Target Word $e_{aj}$ For Alignment $A_{1,1}$ $X = \{e_{(aj-3)}, e_{(aj-2)}, e_{(aj-1)}, e_{(aj+1)}, e_{(aj+2)}, e_{(aj+3)}\}$

| j | $f_j$ | $e_{aj}$ | $X_1$ | $X_2$ | $X_3$ | $X_4$ | $X_5$ | $X_6$ |
|---|-------|----------|-------|-------|-------|-------|-------|-------|
| 3 | est   | is       | <null>| The   | key   | in    | the   | door  |
| 4 | dans  | in       | The   | key   | is    | the   | door  | .     |
| 5 | la    | the      | key   | is    | in    | door  | .     | <null>|
| 6 | porte | door     | is    | in    | the   | .     | <null>| <null>|

As shown in Table 6a, in this hypothetical example the context X of a selected target word consists of the three target words preceding the selected target word and the three target words following the selected target word in the target hypothesis. The context also includes punctuation and absence of words.

In general, the context of the target word $e_{aj}$ in the target hypothesis E which is connected to a source word $f_j$ may be contained in at least one of two or more context classes. The estimated conditional probability of occurrence of a source word, given the target word in the target hypothesis which is connected to the source word and given the context of the target word connected to the source word, may comprise at least one function having a value dependent on the class containing the context of the target word which is connected to the source word.

Alternatively, the context may comprise at least one word having a part of speech in the target hypothesis. The estimated conditional probability of occurrence of a source word, given the target word in the target hypothesis which is connected to the source word and given the context of the target word which is connected to the source word, may comprise at least one function having a value dependent on the part of speech in the target hypothesis of at least one word in the context of the target word which is connected to the source word.

In another example, the context of the target word in the target hypothesis which is connected to a source word comprises at least one word having an identity. The estimated conditional probability of occurrence of the source word, given the target word in the target hypothesis which is connected to the source word and given the context of the target word which is connected to the source word, comprises at least one function having a value dependent on the identity of at least one word in the context of the target word which is connected to the source word.

Equations 3a, 4a, 5a, and 6a are hypothetical examples of functions having values dependent on the context of the target word which is connected to a source word.

$g_1$(f,e=key, X)=1, if f="clef", and the word $x_3$ in X immediately preceding "key" is "the"; (3a)

=0, otherwise.

$g_2$(f,e=key, X)=1, if f="clef", and the word $x_3$ in X immediately preceding "key" is "car"; (4a)

=0, otherwise.

$g_3$(f,e=key, X)=1, if f="ton", and the word $x_3$ in X immediately preceding "key" is "the"; (5a)

=0, otherwise.

$g_4$(f,e=key, X)=1, if f="ton", and the word $x_4$ in X immediately following "key", or the word $x_5$ in X next following "key" is an element of the set (A, B, C, D, E, F, G); (6a)

=0, otherwise.

In Equation 3a, the hypothetical context function $g_1$, has a value of 1, if the source word f is "clef", if the target word e is "key", and if the word in the context X immediately preceding "key" is "the". If these conditions are not met, the context function $g_1$, has a value of 0.

The hypothetical context function $g_2$, of Equation 4a has a value of 1, if the source word f is "clef", if the target word e is "key", and if the word in the context X immediately preceding "key" is "car". If these conditions are not met, the function $g_2$ has a value of 0.

In Equation 5a, the hypothetical context function $g_3$, has a value of 1 if the source word is "ton", if the target word e is "key", and if the word in the context X immediately preceding "key" is "the". If these conditions are not met, the context $g_3$ has a value of 0.

Finally, the hypothetical context function $g_4$ in Equation 6a has a value of 1 if the source word f is "ton", the target word e is "key", and if the word in the context X immediately following "key", or the word in the context X next following "key" is an element of the set (A, B, C, D, E, F, G). If these conditions are not met, the context function g, has a value of 0.

Table 7a illustrates the evaluation of context functions g(f, e, X) for the source word f="clef", for the target word= "key", and for the context X of the target word "key" in the target hypothesis $E_1$ of Table 2a.

which depends on the target word e and the context X of the target word e, as shown in Equation 8a.

$$N(e, X) = \sum_f \sum_{e_i} \lambda_{(e,i)} q_i(f, e, X) \quad (8a)$$

For the target word e="key" and for the hypothetical context functions $g_1$ through $g_4$ of Equations 3a–6a, above, Equation 9a is a hypothetical model for generating word match scores for source words f.

$$(ey, X) = \frac{1}{N(e, X)} \times e^{[\lambda_{(e=key,1)} q_1(f,e=key,X) + \lambda_{(e=key,2)} q_2]} \times \quad (9a)$$
$$e^{[\lambda_{(e=key,3)} q_3(f,e=key,X) + \lambda_{(e=key,4)} q_4(f,e=key,X)]}$$

For the purpose of Equation 9a, the normalization N(e, X) is given by Equation 10a.

$$N(e = key, X) = \sum_f \sum_{e_i} \lambda_{(e=key,i)} q_i(f, e = key, x) \quad (10a)$$

To illustrate the use of this model, hypothetical values for the model parameters are $\lambda_{(e=key,\ 1)}$=0.12, $\lambda_{(e=key,\ 2)}$=0.34, $\lambda_{(e=key,\ 3)}$=0.09, and $\lambda$(e=key, 4)=0.40. Table 8a illustrates the computation of the word match score from Equations 7a and 9a for the source word "clef", the target word "key", and the context X of "key" in the target hypothesis $E_1$ of Table 2a.

TABLE 7a

Context Functions g(f, e, X)

| | | | $X = \{e_{(aj-3)}, e_{(aj-2)}, e_{(aj-1)},$ $e_{(aj+1)}, e_{(aj+2)}, e_{(aj+3)}\}$ | | | | | | $g(f_j, e_{aj}, X)$ | | | |
|---|---|---|---|---|---|---|---|---|---|---|---|---|
| j | $f_j$ | $e_{aj}$ | $X_1$ | $X_2$ | $X_3$ | $X_4$ | $X_5$ | $X_6$ | $g_1$ | $g_2$ | $g_3$ | $g_4$ |
| 2 | clef | key | <null> | <null> | The | is | in | the | 1 | 0 | 0 | 0 |

As shown in Table 7a, the context function $g_1$ has a value of 1, and the context functions $g_2$, $g_3$ and $g_4$ have values of 0.

As discussed above, the word match score for each source word and each target hypothesis comprises an estimate of the conditional probability P(f|e, X) of occurrence of the source word f given the target word e in the target hypothesis which is connected to the source word f and given the context X of the target word e in the target hypothesis which is connected to the source word f. The word match score may be obtained, for example, using a model defined by Equation 7a as follows.

$$P(f \mid e, X) = \frac{1}{N(e, X)} e^{\sum_i \lambda_{(e,i)} q_i(f,e,X)} \quad (7a)$$

In Equation 7a, the functions $g_i(f, e, X)$ are functions having values dependent on the context X of the target word e which is connected to the source word f in an alignment between an input series of source words and a target hypothesis. The parameters $\lambda_{(e,\ i)}$ are parameters representing the relative strength of each context function $g_i$ in predicting the source word f from the target word e in the context X. The quantity N(e, X) is a normalization factor TABLE 8a Computation of Word Match Score P("clef"|"key", X)

| | | $X = \{e_{(aj-3)}, e_{(aj-2)}, e_{(aj-1)},$ $e_{(aj+1)}, e_{(aj+2)}, e_{(aj+3)}\}$ | | | | | | $g(f_j, e_{aj}, X)$ | | | |
|---|---|---|---|---|---|---|---|---|---|---|---|
| $f_j$ | $e_{aj}$ | $x_1$ | $x_2$ | $x_3$ | $x_4$ | $x_5$ | $x_6$ | $g_1$ | $g_2$ | $g_3$ | $g_4$ |
| clef | key | <null> | <null> | The | is | in | the | 1 | 0 | 0 | 0 |
| ton | key | <null> | <null> | The | is | in | the | 0 | 0 | 1 | 0 |

$\lambda_{(e\ =\ key,\ 1)}$ = .12

$\lambda_{(e\ =\ key,\ 2)}$ = .34

$\lambda_{(e\ =\ key,\ 3)}$ = .09

$\lambda_{(e\ =\ key,\ 4)}$ = .40

$\sum_i \lambda_{(e,\ i)} g_i$ (clef, key, X) = 1.127

$\sum_i \lambda_{(e,\ i)} g_i$ (ton, key, X) = 1.094

TABLE 8a-continued

Computation of Word Match Score P("clef"|"key", X)

$$X = \{e_{(aj-3)}, e_{(aj-2)}, e_{(aj-1)}, e_{(aj+1)}, e_{(aj+2)}, e_{(aj+3)}\}$$

| $f_j$ | $e_{aj}$ | $x_1$ | $x_2$ | $x_3$ | $x_4$ | $x_5$ | $x_6$ | $g_1$ | $g_2$ | $g_3$ | $g_4$ | $g(f_i, e_{aj}, X)$ |
|---|---|---|---|---|---|---|---|---|---|---|---|---|

$$X) = e^{\sum \lambda_{(e,i)} q_i \text{(clef, key, X)}} + e^{\sum \lambda_{(e,i)} q_i \text{(ton, key, X)}}$$

P("clef"|"key", X) = 0.507

In this hypothetical example, the conditional probability P("clef "|"key", X) of occurrence of the source word "clef" given the target word "key" in the target hypothesis which is connected to the source word "clef" given the target word "key" in the target hypothesis which is connected to the source word "clef" and given the context X of the target word "key" in the target hypothesis which is connected to the source word "clef" is equal to 0.507 (from Equations 9a and 10a).

If the alignment identifier 18 identifies two or more alignments between the input series of source words and each target hypothesis, the word match score generator 20 generates a word match score for each source word and each alignment and each target hypothesis. Each word match score may be estimated using the model of Equation 7a.

If the source text input device 10 comprises means for transforming the input series of source words into a series of transformed source words, then the word match score generator generates a word match score for each transformed source word and each target hypothesis. The word match score comprises an estimate of conditional probability of occurrence of the transformed source word, given the target word in the target hypothesis which is connected to the transformed source word and given the context of the target word in the target hypothesis which is connected to the transformed source word. The word match score for a transformed word may also be estimated using the model of Equation 7a.

Referring to FIG. 11, the translation apparatus further comprises a translation match score generator 22. The translation match score generator 22 generates, for each target hypothesis, a translation match score comprising a combination of the word match scores for the target hypothesis and the source words in the input series of source words. Thus, the translation match score for a target hypothesis may, for example, comprise the product of the word match scores for the target hypothesis and the source words in the input series of source words.

Table 9a illustrates the computation of a translation match score for the input series of source words $f_j$ of Table 1a, and for the target words $e_{aj}$ in the target hypothesis $E_1$ of Table 2a.

TABLE 9a

Translation Match Score: Alignment = $A_{1,1}$

| j | $f_j$ | $a_j$ | $e_{aj}$ | $P(F_j|e_{aj}, X)$ |
|---|---|---|---|---|
| 1 | La | 1 | The | 0.91 |
| 2 | clef | 2 | key | 0.507 |
| 3 | est | 3 | is | 0.87 |
| 4 | dans | 4 | in | 0.63 |

TABLE 9a-continued

Translation Match Score: Alignment = $A_{1,1}$

| j | $f_j$ | $a_j$ | $e_{aj}$ | $P(F_j|e_{aj}, X)$ |
|---|---|---|---|---|
| 5 | la | 5 | the | 0.91 |
| 6 | porte | 6 | door | 0.79 |

Translation Match Score =

$$\prod_{j=1}^{6} P(f_j|e_{aj}, X) = 0.182$$

(to illustrate the invention, this example assumes the fertility and distortion scores, and the combinatorial factor are all equal to 1)

Each word match score $P(f_j|e_{aj}, X)$ is obtained from Equation 7a. The numbers in Table 9a are hypothetical numbers. For the purpose of illustrating the present invention, the fertility and distortion scores of Brown et al., described above, are assumed equal to one.

Returning to FIG. 11, the translation apparatus comprises a hypothesis match score generator 24 for generating a target hypothesis match score for each target hypothesis. Each target hypothesis match score comprises a combination (for example, the product) of the language model match score for the target hypothesis and the translation match score for the target hypothesis. As discussed above, the language model match score may be obtained from known language models such as the n-gram language models described in section 6 of Brown et al.

If the alignment identifier 18 identifies two or more alignments between the input series of source words and each target hypothesis, the translation match score for each target hypothesis comprises a combination of the word match scores for the target hypothesis and the alignments and the source words in the input series of source words.

If the source text input device 10 comprises means for transforming the input series of source words into a series of transformed source words, the translation match score comprises a combination of the word match scores for the target hypothesis and the transformed source words.

The translation apparatus shown in FIG. 11 further comprises an output device 26. The output device 26 outputs the target hypothesis having the best target hypothesis match score. The output device 26 may comprise, for example, a display or a printer.

If the source text input output device 10 comprises means for transforming the input series of source words into a series of transformed source words, then the output 26 comprises means for synthesizing a series of output words from the target hypothesis having the best target hypothesis match score. The means for synthesizing output words from the target hypothesis may comprise target transducers such as those described in Section 5 of Brown et al. (cited above). For example, the target word "be" with a tag representing the tense of the original input source word, may be transformed to one of the synthesized output words {be, was, were, been, % am, are, is, being} which are forms of the verb infinitive "be".

As described above, Equation 7a is an example of a model which may be used to obtain word match scores according to the present invention. The context functions $g_i(f, e, X)$ of the word match score model, and the parameters $\lambda_{(e, i)}$, of the word match score model may be obtained as follows.

Candidate context functions $g_i(f, e, X)$ may be obtained, for example, by limiting the context X of the target word in the target hypothesis to three words to the left of the target word e and three words to the right of the target word e, as shown in the example of Table 6a, above.

Next, a training text of source language sentences and target language sentences which are translations of each other is obtained. Corresponding source language sentences and target language sentences which are translations of each other may be identified, for example, by a skilled translator. Preferably, corresponding source language sentences and target language sentences which are translations of each other may be identified automatically, for example, by the method described in Sections 12 And 13 of Brown et al. (cited above).

For each pair of corresponding source and target sentences in the training text, the estimated most probable alignment between the source words and the target words is found using the method described above used by the alignment identifier 18. Each occurrence of a target word $e_{aj}$ in the training text is then identified and tagged with the source word $f_j$ connected to the target word $e_{aj}$ in each alignment. The target word $e_{aj}$ is also tagged with its context X in each target sentence.

Table 10a illustrates a hypothetical example of training events for a target word $e_{aj}$="key" in a training text of aligned source language sentences and target language sentences.

TABLE 10a

TRAINING EVENTS
Occurrences of $e_{aj}$ = "key" in a training text of aligned source and
target sentences, the source word $f_j$ connected to "key" in each
alignment, and the context X of "key" in each target sentence.

| | | $X = \{e_{(aj-3)}, e_{(aj-2)}, e_{(aj-1)}, e_{(aj+1)}, e_{(aj+2)}, e_{(aj+3)}\}$ | | | | | |
|---|---|---|---|---|---|---|---|
| $f_j$ | $e_{aj}$ | $X_1$ | $X_2$ | $X_3$ | $X_4$ | $X_5$ | $X_6$ |
| clef | key | <null> | My | car | is | on | the |
| clef | key | make | me | a | for | my | door |
| ton | key | she | sings | in | <null> | <null> | <null> |
| clef | key | <null> | <null> | The | unlocks | the | safe |
| ton | key | play | in | the | of | B | flat |
| ton | key | finger | on | the | of | middle | C |
| . | . | . | . | . | . | . | . |
| . | . | . | . | . | . | . | . |
| . | . | . | . | . | . | . | . |

Using the training events for a target word $e_{aj}$ from the training text, candidate context functions $g_i(f, e, X)$ may be obtained by first identifying types of context functions. For example, one type of context function tests for the presence of a particular word in one or more positions in the context. Another type of context function tests for the presence of a particular word class (for example, part of speech) in one or more positions in the context. The particular words or word classes to be tested for in a context function for a target word e can be obtained from the words and classes in the context of the target word e in the training text.

Alternatively, candidate context functions $g_i(f, e, X)$ may be obtained by clustering the training events according to their context X using the method described in Section 7 of Brown et al. (cited above).

Initially, all of the parameters $\lambda_{(e, i)}$ of the word match score model of Equation 7a are set equal to zero.

For each candidate context function $g_i(f, e, X)$, a "measure of merit" G(i) is calculated according to Equation 11a.

$$G(i) = \frac{(Eg_i(f, e, X) - \tilde{E}g_i(f, e, X))^2}{E(g_i(f, e, X) - E(g_i(f, e, X) \mid X))^2} \quad (11a)$$

where $$Eg_i(f, e, X) = \sum_{f,x} P(f \mid X)\tilde{P}(X)g_i(f, x) \quad (12a)$$

$$\tilde{E}g_i(f, e, X) = \sum_{f,x} \tilde{P}(f, X)g_i(f, X) \quad (13a)$$

$$f, e, X) \mid X) = \sum_{f,x} P(f \mid X)\tilde{P}(X)(\sum_{f} P(f \mid X)g_i( \quad (14a)$$

In Equations 11a through 14a, the conditional probability P(f|X) of a source word f given the context X of the connected target word e is obtained from Equation 7a using the most recent values of the model parameters. The probability P(X) of a context X is obtained by counting occurrences of the target word e and the context X in the training text events of the type shown in Table 10a, and dividing the count by the total number of events in the training text in which the target word is e. The probability P(f, X) of a source word f and a context X are obtained by counting occurrences of the target word e, the context X, and the source word f in the training text events of the type shown in Table 10a, and dividing each count the total number of events in the training text in which the target word is e.

The context function $g_i(f, e, X)$ having the highest "measure of merit" G(i) from Equation 11a is selected as a context function to be used in Equation 7a. The parameter $\lambda_{(e, i)}$ is obtained by initially setting $\lambda_{(e, i)}=0$, and then solving the following Equation 15a for the quantity $\Delta\lambda_{(e, i)}$ $$f \mid X)g_i(f, e, X)e^{[\Delta\lambda_{(e,i)}\Sigma_i q_i(f,e,X)]} = \sum_{f,x} \tilde{P}(f, X) \quad (15a)$$

A new value of $\lambda_{(e, i)}$ is obtained by adding the value of $\Delta\lambda_{(e, i)}$ to the previous value of $\lambda_{(e, i)}$. Using the new value of $\lambda_{(e, i)}$, Equation 15a is then again solved for a new value of $\Delta\lambda_{(e, i)}$. The process is repeated, each time updating the value of $\lambda_{(e, i)}$ until the value of $\Delta\lambda_{(e, i)}$ falls below a selected threshold. This method is known as iterative scaling.

Using the new model for the word match score (Equation 7a), the "measures of merit" G(i) of Equation 11a are recomputed for the remaining candidate context functions $g_i(f, e, X)$ to identify the remaining context function having the highest "measure of merit". The best remaining context function is added to the word match score model of Equation 7a and new values of all of the parameters $\lambda_{(e, i)}$ are calculated using the iterative scaling method and Equation 15a. When the word match score model of Equation 7a contains two or more parameters $\lambda_{(e, i)}$, every parameter $\lambda_{(e, i)}$ is updated exactly once per iteration, so all parameters converge in the same iteration. The process is repeated on the remaining candidate context functions $g_i(f, e, X)$ until the "measure of merit" of the best context function falls below a selected threshold.

In the translation apparatus according to FIG. 11, the target hypothesis generator 12, the language model match score generator 16, the alignment identifier 18, the word match score generator 20, the translation match score generator 22, and the hypothesis match score generator 24 may be suitably programmed general purpose or special purpose digital signal processors. The target language vocabulary store 14 may be computer storage, such as random access memory. The means for transforming the input series of source words into a series of transformed source words in the source text input device 10, and the means for synthesizing a series of output words from the target hypothesis having the best target hypothesis match score of the device output 26 may also be suitably programmed general purpose or special purpose digital signal processors.

Maximum Entropy

We introduce the concept of maximum entropy through a simple example. Suppose we wish to model an expert translator's decisions on the proper French rendering of an English word, say the word in. Our model p of the expert's decisions assigns to each French word or phrase f an estimate, p(f), of the probability that the expert would choose f as a translation of in. To guide us in developing p, we collect a large sample of instances of the expert's decisions. Our goal is to extract a set of clues from the sample (the first task of modelling) that will aid us in constructing a model of the process (the second task).

One obvious clue we might glean from the sample is the list of allowed translations. For example, we might discover that the expert translator always chooses among the following five French phrases: {dans, en, à, au cours de, pendant}. With this information in hand, we can impose our first constraint on our model p:

p(dans)+p(en)+p(à)+p(au cours de)+p(pendant)=1

This equation represents our first statistic of the process; we can now proceed to search for a suitable model which obeys this equation. But there are an infinite number of models p for which this identity holds. One possible model is p(dans)=1; in other words, the model always predicts dans. Another model which obeys this constraint predicts pendant with a probability of ½, and à with a probability of ½. But both of these models offend our sensibilities: knowing only that the expert always chose from among these five French phrases, how can we justify either of these probability distributions? Each seems to be making rather bold assumptions, with no empirical justification. Put another way, these two models assume more than we actually know about the expert's decision-making process. All we know is that the expert chose exclusively from among these five French phrases; given this, the most (and only) intuitively appealing model is the following:

p(dans)=⅕
p(en)=⅕
p(à)=⅕
p(au cours de)=⅕
p(pendant)=⅕

This model, which allocates the total probability evenly among the five possible outcomes, is the most uniform model subject to our knowledge. It is not, however, the most uniform overall; that model would grant an equal probability to every possible French phrase.

We might hope to glean more clues from our sample about the expert's decision-making. Suppose we notice that the expert chose either dans or en 30% of the time. We could apply this knowledge to update our model of the translation process by requiring that p satisfy two constraints:

p(dans)+p(en)=3/10 p(dans)+p(en)+p(à)p(au cours de)+p(pendant)=1

Once again there are many probability distributions consistent with these two constraints. In the absence of any other knowledge, a reasonable choice for p is again the most uniform—that is, the distribution which allocates its probability as evenly as possible, subject to the constraints:

p(dans)=3/20
p(en)=3/20
p(à)=7/30
p(au cours de)=7/30
p(pendant)=7/30

Say we inspect the data once more, and this time notice another interesting fact: in half the cases, the expert chose either dans or à. We can incorporate this information into our model as a third constraint:

p(dans)+p(en)=3/10 p(dans)+p(en)+p(à)+p(au cours de)+p(pendant)=1 p(dans)+p(à)=½

We can once again look for the most uniform p satisfying these constraints, but now the choice is not as obvious. As we have added complexity, we have encountered two difficulties at once. First, what exactly is meant by "uniform," and how can one measure the uniformity of a model? Second, having determined a suitable answer to these related questions, how does one go about finding the most uniform model subject to a set of such constraints?

The maximum entropy method answers both these questions, as we will demonstrate in the next few pages. Intuitively, the principle is simple: model all that is known and assume nothing about that which is unknown. In other words, given a collection of facts, choose a model consistent with all the facts, but which otherwise is as uniform as possible. This is precisely the approach we took in selecting our model p at each step in the above example.

Maximum Entropy Modelling

Setup

We consider a random process which produces an output value y, a member of a finite set Y. For the translation example just considered, the process generates a translation of the word in, and the output y can be any word in the French vocabulary Y. In generating y, the process makes use of some contextual information x, a member of a finite set X. In the present example, this information could include the English words surrounding in. For the sake of simplicity, this example did not make use of contextual information. Surely, though, a model which can examine the English words surrounding in for hints is likely to predict an expert's preferred French translation with much higher accuracy than a context-ignorant model.

Our task is to construct a stochastic model that accurately represents the process. Such a model is a method of estimating the conditional probability that, given a context x, the process will output y. We will denote by p(y|x) the probability that the model assigns to y in context x. With a slight abuse of notation, we will also use p(y|x) to denote the entire conditional probability distribution provided by the model, with the interpretation that y and x are placeholders rather than specific instantiations. The proper interpretation should be clear from the context. We will denote by P the set of all conditional probability distributions. Thus a model p(y|x) is, by definition, just an element of P.

Training Data

To study the process, we begin by collecting a large number of samples generated by the process:

$(x^1, y^1), (x^2, y^2), \ldots, (x^N, y^N)$

We call this the training data. The ith sample consists of a context $x^i$ and an output $y^i$ of the process for that context. In the example we have been considering, each sample would consist of a phrase x containing the words surrounding in, together with the translation y of in which the process produced.[1]

[1] For now we can imagine that these training samples have been generated by a human expert who was presented with a number of random phrases containing in and asked to choose a good translation. When we discuss a realistic translation modelling task later, we will show how such samples can be automatically extracted from a bilingual corpus.

We can summarize the training sample in terms of its empirical probability distribution p, defined by p(x, y)=1/N×number of times that (x, y) occurs in the sample Typically, of course, a particular pair (x, y) will either not occur at all in the sample, or will occur at most a few times.

Statistics and Features

To construct a stochastic model, we look for statistics of the process that are represented reliably in the training sample. In the translation example we imagined several such statistics: the frequency that in translated to either dans or en was 3/10; the frequency that it translated to either dans or au cours de was ½; and so on. These particular statistics were context independent, but we could also have considered statistics which depend on x. For instance, we might have noticed that, in the sample, if April is the word following in, then the translation of in is en with frequency 9/10.

We can write any such a statistic as the empirical average of a real-valued function $f(x, y)$ of the pair (x, y). For example, to express the frequency that in translates as en when April is the following word, we can introduce the indicator function $f(x, y)$ which is 1 when y is en and April is the following word, and 0 otherwise:

$$f(x, y) \begin{cases} = 1 \text{ if } y = en \text{ and } April \text{ follows } in \\ = 0 \text{ otherwise} \end{cases}$$

The expected value of $f$ with respect to the empirical distribution p(x, y) is exactly the desired frequency. We denote this expected value by $E[f]$; thus $$\tilde{E}[f] \equiv \sum_{x,y} \tilde{p}(x, y) f(x, y)$$

Clearly we can express the frequency of any event as the expected value of an appropriate binary-valued indicator function $f$. We call such function a feature function for short. As with probability distributions, we will sometimes abuse notation and use $f(x, y)$ to denote both the value of $f$ at a particular pair (x, y) as well as the entire function $f$. Again, the proper interpretation should be apparent from the context.

Constraints

When we discover a statistic that we feel is reliably represented in the training sample, we can acknowledge its importance by requiring that our model accord with it. We do this by constraining the expected value that the model assigns to the corresponding feature function $f$.

The expected value of $f$ as computed by the model p(y|x) is $$E[f] \equiv \sum_{x,y} \tilde{p}(x) p(y|x) f(x, y)$$

where p(x) is the empirical distribution of x in the training sample. We constrain this expected value to be the same as the expected value of $f$ in the training sample. That is, we require $$E[f] = \tilde{E}[f] \quad (1)$$

More explicitly, this requirement is $$\sum_{x,y} \tilde{p}(x) p(x|y) f(x, y) = \sum_{x,y} \tilde{p}(x, y) f(x, y)$$

We call the requirement (1) a constraint equation or simply a constraint. By restricting attention to those models p(y|x) for which the equality (1) holds, we are eliminating from consideration those models which do not agree with the empirical sample on how often the output of the stochastic process should exhibit the feature $f$. For example, if $f$ is the feature function defined in (1), then the constraint (1) means that we only consider models which predict the translation en of in when April is the following word with the same frequency as we observe this feature within the training sample.

To sum up so far, we now have a means of representing statistical phenomena inherent in a sample of data (namely, $E[f]$), and also a means of requiring that our model of the process exhibit these phenomena (namely, $E[f]=\tilde{E}[f]$).

The Maximum Entropy Principle

Suppose that we are given n feature functions $f_i$, which we feel determine statistics which are represented reliably in the training sample. We would like our model to accord with these statistics. That is, we would like it to be in the subset C of P defined by $$\{p \in P | E[f] = \tilde{E}[f] \text{ for } i \in \{1, 2, \ldots, \quad (2)$$

Figure 1:
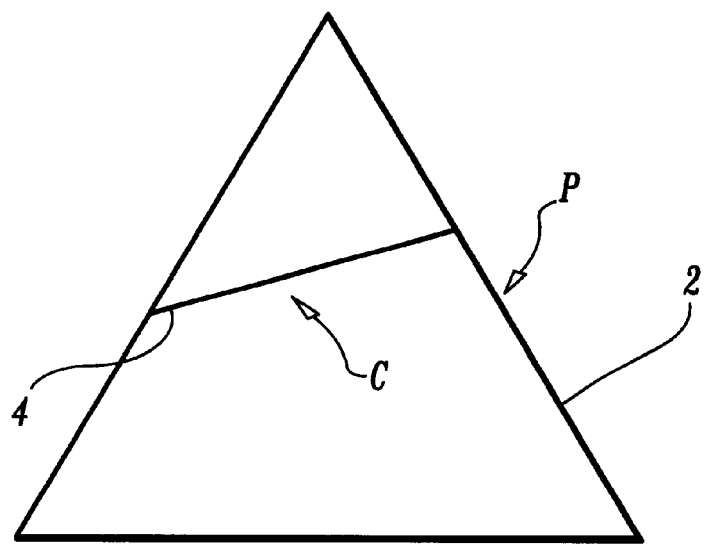
FIG. 1 illustrates a linear subset C of the space of all probability distributions P.

FIG. 1 provides a geometric interpretation of this setup. Here space 2 labelled P is the space of all (unconditional) probability distributions on 3 points, sometimes called a simplex. Restricting attention to those p∈P which satisfy one linear constraint defines a line segment 4 labelled C in the simplex, as shown in the figure. A second linear constraint could determine p exactly, if the two lines intersect at a point; this is the case if the two linear constraints are satisfiable. Alternatively, a second linear constraint could be inconsistent with the first—for instance, the first might require that the probability of the first point is ⅓ and the second that the probability of the third point is ¾. In this case, the line segments do not intersect and no p satisfies the constraints. In the present setting, however, the linear constraints $E[f]=\tilde{E}[f]$ are extracted from the training sample and cannot, by construction, be inconsistent.

Typically, the set C contains an infinite number of probability distributions. Which one should we choose? According to the maximum entropy philosophy, we seek the distribution which is most uniform. But now we face a question left open earlier, in the introduction to the concept of maximum entropy: what does "uniform" mean?

A mathematical measure of the uniformity of a conditional distribution p(y|x) is provided by the conditional entropy[2]

[2] A more common notation for this conditional entropy is H(Y|X), where Y and X are defined to be random variables with joint distribution p(x)p(g|x). To emphasize the dependence of the entropy on the probability distribution p, so we have adopted the alternate notation H(p).

$$H(p) \equiv -\sum_{x,y} \tilde{p}(x) p(y|x) \log p(y|x) \quad (3)$$

The entropy is bounded from below by zero, the entropy of a model with no uncertainty at all, and from above by log |Y| the entropy of the uniform distribution over all possible |Y| values of y.

With this definition, we are ready to present the principle of maximum entropy.

To select a model from a set C of allowed probability distributions, choose the model $p^* \epsilon C$ with maximum entropy H(p):

$$p^* = \underset{p \in C}{\operatorname{argmax}} H(p) \quad (4)$$

It can be shown that there is always a unique model p* with maximum entropy in any constrained set C.

If we impose no constraints on the model, so that C=P, then p* is the element in P with greatest entropy, that is, the uniform distribution. As we impose more constraints, C becomes a smaller proper subset of P, and p* is the model with maximum entropy in this restricted subset. In an extreme situation we might impose enough constraints to single out a unique distribution in P, in which case the maximum entropy principle is not needed. In any case, for any set of constraints, the maximum entropy principle determines a unique model from among a those distributions satisfying the constraints.

Parametric Form

The maximum entropy principle presents us with a problem in constrained optimization: find the $p^* \epsilon C$ which maximizes H(p). In simple cases, we can write the solution to this problem explicitly, and solve it analytically. This was true for the translation example presented earlier, when we imposed the first two constraints on p. However, solving the maximum entropy problem in general requires a more disciplined approach. (The reader is invited to try to calculate the solution for the translation example when the third constraint is imposed.)

To address the general problem we apply the method of Lagrange multipliers from the theory of constrained optimization.

1. We begin with the primal constrained optimization problem $$\text{Find } p^* = \underset{p \in C}{\operatorname{argmax}} H(p)$$

2. For each constraint function $f_i$ we introduce a Lagrange multiplier $\lambda_i$ and define the Lagrangian $\Lambda(p, \lambda)$ by $$\Lambda(p, \lambda) \equiv H(p) + \sum_i \lambda_i \left( E[f_i] - \tilde{E}[f_i] \right) \quad (5)$$

3. Holding $\lambda$ fixed, we compute the unconstrained maximum of the Lagrangian $\Lambda(p, \lambda)$ over all $p \in P$. We denote by $p_\lambda$, the p where $\Lambda(p, \lambda)$ achieves its maximum and by $\Psi(\lambda)$ the maximum value of $\Lambda(p, \lambda)$:

$$p_\lambda = \underset{p \in P}{\operatorname{argmax}} \Lambda(p, \lambda) \quad (6)$$

$$\Psi(\lambda) \equiv \max_{p \in P} \Lambda(p, \lambda) = \Lambda(p_\lambda, \lambda) \quad (7)$$

We call $\Psi(\lambda)$ the dual function.

Using simple calculus it is easy to compute $p_\lambda$ and the dual function $\Psi(\lambda)$ explicitly.

We find $$p_\lambda(y|x) = \frac{1}{Z_\lambda(x)} \exp\left( \sum_i \lambda_i f_i(x, y) \right) \quad (8)$$

$$\Psi(\lambda) = -\sum_x \tilde{p}(x) \log Z_\lambda(x) + \sum_i \lambda_i \tilde{E}[f_i] \quad (9)$$

where $Z_\lambda(x)$ is a normalizing constant determined by the requirement that $\Sigma_y p_\lambda(y|x) = 1$ for all x:

$$Z_\lambda(x) = \sum_y \exp\left( \sum_i \lambda_i f_i(x, y) \right) \quad (10)$$

4. Finally, we pose the unconstrained dual optimization problem $$\text{Find } \lambda^* = \underset{\lambda}{\operatorname{argmax}} \Psi(\lambda)$$

At first glance it is not clear what these machinations achieve. However, a fundamental principle in the theory of Lagrange multipliers, called generically the Kuhn-Tucker theorem, asserts that under suitable assumptions, the primal and dual problems are, in fact, closely related. This is the case in the present situation. Although a detailed account of this relationship is beyond the scope of this paper, it is easy to state the final result: Suppose that $\lambda^*$ is the solution of the dual problem. Then $\lambda^*$ is the solution of the primal problem; that is $p_{\lambda^*} = p^*$.

In other words,[3]

The maximum entropy model subject to the constraints C has the parametric form $p_{\lambda^*}$ of equation (8), where the parameter values $\lambda^*$ can be determined by maximizing the dual function $\Psi(\lambda)$.

A proof and mathematical discussion can be found in [14].

[3] It might be that the dual function $\Psi(\lambda)$ does not achieve its maximum at any finite $\lambda^*$. In this case, the maximum entropy model will not have the form $p\lambda$ for any $\lambda$. However, it will be the limit of models of this form, as indicated by the following result:
Suppose that $\lambda_n$ is any sequence such that $\Psi(\lambda_n)$ converges to the maximum of $\Psi(\lambda)$. Then $p\lambda_n$ converges to $p^*$.

The most important practical consequence of this result is that any algorithm for finding the maximum $\lambda^*$ of $\Psi(\lambda)$ can be used to find the maximum p* of H(p) for p∈C.

Relation to Maximum Likelihood

The log-likelihood L(p, p) of the empirical distribution p as predicted by a model p is defined by $$\tilde{p}) \equiv \log \prod_{x,y} p(y|x)^{\tilde{p}(x,y)} = \sum_{x,y} \tilde{p}(x, y) \log p \, ( \quad (11)$$

It is easy to check that the dual function $\Psi(\lambda)$ of the previous section is, in fact, just the log-likelihood for the exponential model $p_\lambda$; that is $$\Psi(\lambda) = L(p_\lambda, \tilde{p}) \quad (12)$$

With this interpretation, the result of the previous section can be rephrased as: The model $p^* \epsilon C$ with maximum entropy $H(p)$ is the model in the parametric family $p_\lambda(y|x)$ that maximizes the likelihood $L(p_\lambda, p)$ of the training sample p.

Computing the Parameters

For all but the most simple problems, the $\lambda^*$ that maximize $\Psi(\lambda)$ cannot be found analytically. Instead, we must resort to numerical methods. From the perspective of numerical optimization, the function $\Psi(\lambda)$ is well behaved, since it is smooth and convex-∩ in $\lambda$. Consequently, a variety of numerical methods can be used to calculate $\lambda^*$. One simple method is coordinate wise ascent, in which $\lambda^*$ is computed by iteratively maximizing $\Psi(\lambda)$ one coordinate at a time. When applied to the maximum entropy problem, this technique yields the popular Brown algorithm (See, "*A Note on Approximations to Discrete Probability Distributions*", by D. Brown, appearing in Information and Control, Vol. 2 pp. 386–392, 1959). Other general purpose methods that can be used to maximize $\Psi(\lambda)$ include gradient ascent and conjugate gradient.

An optimization method specifically tailored to the maximum entropy problem is the iterative scaling algorithm of Darroch and Ratcliff (See, "*Generalized Iterative Scaling for Log-Linear Models*" by J. N. Darroch and D. Ratcliff, appearing in The Annals of Mathematical Statistics, Vol. 43, No. 5, pp. 1470–1480, 1972). We present here a version of this algorithm that is applicable whenever the feature functions $f_i(x, y)$ are non-negative; i.e. $f_i(x, y) \geq 0$ for all i, x, y. This is, of course, true for the binary-valued feature functions we are considering here. More generally, for any set of feature functions, it is easy to construct a new set of feature functions which are non-negative and which define the same constrained set C. The algorithm generalizes the Darroch-Ratcliff procedure, which requires, in addition to the non-negativity, that the feature functions satisfy $\Sigma_i f_i(x, y)=1$ for all x, y.

Algorithm 1 Improved Iterative Scaling

Input: Feature functions $f_i$; empirical distribution p(x, y)

Output: Optimal parameter values $\lambda^*_i$; optimal model $p_\lambda$.
1. Start with $\lambda_i=0$ for all $i \epsilon \{1,2,\ldots,n\}$
2. For each $i \epsilon \{1,2,\ldots,n\}$ do the following:
   a. Let $\Delta\lambda_i$ be the solution to the following equation:

$$(x)p_\lambda(y|x)f_i(x, y) \exp (\Delta\lambda_i f\#(x, y))=\tilde{E}| \quad (13)$$

where $$f^{\|}(x, y) \equiv \sum_{i=1}^{n} f_i(x, y) \quad (14)$$

b. Update the value of $\lambda_i$ according to: $\lambda_i \leftarrow \lambda_i + \Delta\lambda_i$
3. Go to step 2 if all the $\lambda_i$ have not all converged The key step in the algorithm is step (2a), the computation of the increments $\Delta\lambda_i$ that solve (13). If $f\#(x, y)$ is constant, say $f\#(x, y)=M$ for all x, y, then $\Delta\lambda_i$ is given explicitly as $$\Delta\lambda_i = \frac{1}{M} \log \frac{\tilde{E}[f_i]}{E[f_i]}$$

If $f\#(x, y)$ is constant, then $\Delta\lambda_i$ must be computed numerically. A simple and effective way of doing this is by Newton's method.

Feature Selection

In the earlier discussion on statistical modelling, we divided the statistical modelling problem into two steps. The first is to find appropriate facts about the data; the second is to incorporate these facts into the model. Up to this point we have proceeded by assuming that the first task was somehow performed for us. Even in the translation example presented previously, we did not explicitly state how we selected those particular constraints: why the fact that dans or à0 was chosen by the expert translator 50% of the time is any more important than countless other facts contained in the data was left unaddressed. In fact, the principle of maximum entropy does not directly concern itself with this issue: it merely provides a recipe for combining constraints into a model. But the feature selection problem is critical, since the universe of possible constraints is typically in the thousands or even millions. In this section we introduce a method for automatically selecting the features to be included in a maximum entropy model, and then offer a series of refinements to ease the computational burden.

Motivation

We will denote the complete set of features by F. We will refer to F as the set of candidate features since each $f \epsilon F$ is a candidate for inclusion into our model of the random process. Typically, we cannot reliably estimate the empirical expectation $E[f]$ for every candidate feature $f \epsilon F$, since many features will have been observed only rarely in a sample of training data. That is, for any set of training events $$(x^{(1)}, y^{(1)}), (x^{(2)}, y^{(2)}), \ldots, (x^{(N)}, y^{(N)})$$

there will typically be many candidate features $f$ for which $f(x^{(i)}, y^{(i)})$ is non-zero for only a small number of events $(x^{(i)}, y^{(i)})$. We certainly do not want to include such rarely observed features into our model.

In general, we would like to include in the model only a subset S of the full set of candidate features F. The choice of S—the set of active features—must strike a balance between two competing objectives. On the one hand, S must be sufficiently rich to capture as much information about the random process as possible. On the other hand, S must be limited so that the model determined by S is robust enough to generalize to new data.

We might first be inclined to let S contain all features which have been observed sufficiently often in the training sample. This is not, however, an adequate criterion; even if every $f$ in S has been observed many times, the interplay between different features in S might implicitly impose additional constraints corresponding to features that are not observed sufficiently. We provide an example of this phenomenon below in section A The Danger of Implicit Constraints (following section listing full citations of references).

Basic Feature Selection Algorithm

Figure 2:
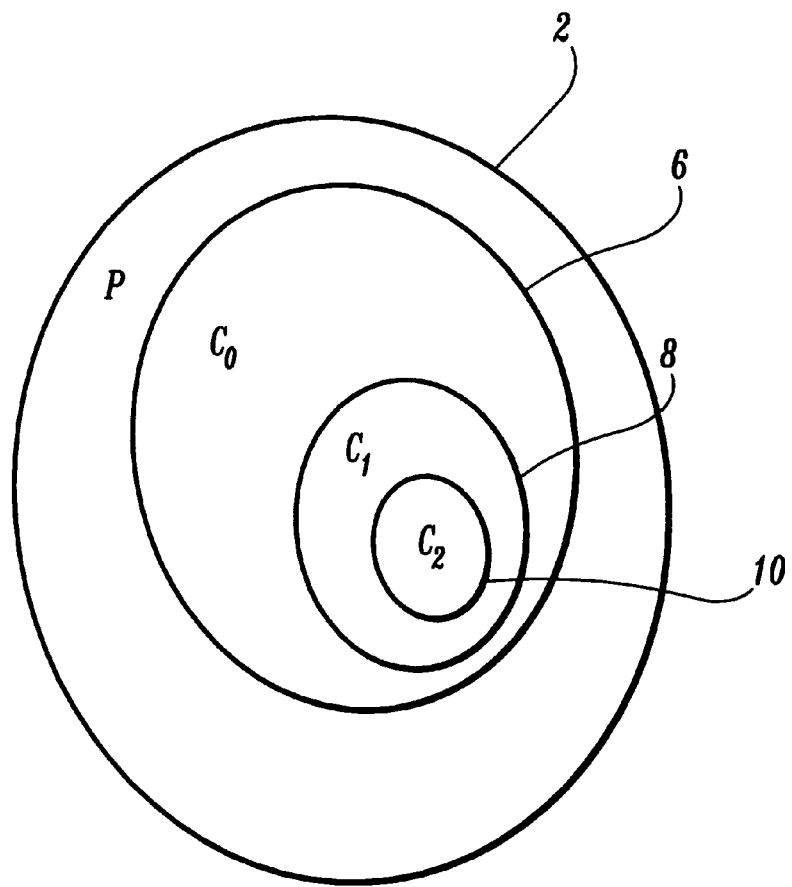
FIG. 2 illustrates a nested sequence of subsets

An incremental approach to feature selection, similar to the strategy used for growing decision trees, turns out to be much more fruitful. The idea is to build up S by successively adding features. The choice of feature at each point is determined by the training data. Each time a candidate feature is adjoined to S, another linear constraint is imposed (using (I)) on the space C of models allowed by the features in S. As a result, the space of models allowed by the features in S shrinks; the model $p^*$ in C with the greatest entropy reflects ever-increasing knowledge and thus (hopefully)

becomes a more accurate representation of the process. The situation is illustrated in FIG. 2, which depicts a sequence of nested subsets 6, 8, 10 of P, labelled $C_0$, $C_1$, $C_2$, respectively such that $C_0 \supset C_1 \supset C_2 \ldots$ of P correspond to ever-larger feature sets $S_0 \subset S_1 S_2 \ldots$ The incremental growth procedure may be outlined as follows. Every stage of the process is constrained space C(S) and characterized by a current set of active features S, a corresponding a model ps, the model with maximum entropy subject to the constraints determined by the features in S:

$$C(S)=\{p|E[f]=\tilde{E}[f], \text{ for all } f \in S\} \qquad (X)$$

$$p^S = \underset{p \in C(S)}{\operatorname{argmax}} H(p)$$

To perform the incremental update we select from the candidate feature set F that feature $f$ which, when adjoined to S, produces the greatest increase in the log-likelihood of the training data.

Algorithm 2 Basic Feature Selection
Input: Set F of candidate features; empirical distribution p(x, y)
Output: Set S of active features; model $p^S$ incorporating these features
1. Start with S={Ø}; thus $p^S$ is uniform
2. For each candidate feature $f \in F$:
   Compute the model $p^{S \cup f}$
   Compute the gain in the log-likelihood from adding this feature:

$$\Delta L(f) \equiv L(p^{S \cup f}) - L(p^S) \qquad (Y)$$

3. Check the termination condition
4. Select the feature $f$ with maximal gain
5. Adjoin $f$ to S
6. Compute $p^S$ using Algorithm 1
7. Go to step 2

One issue left unaddressed by this algorithm is the termination condition. Obviously, we would like a condition which applies exactly when all the "useful" features have been selected. One reasonable stopping criterion is to subject each proposed feature to cross-validation on a held-out sample of data. If the feature does not lead to an increase in likelihood of the held-out sample of data, the feature is discarded. We will have more to say about the stopping criterion in Section below.

Approximate Gains

Algorithm 2 is not a practical algorithm for incremental feature selection. For each candidate feature $f \in F$ considered in Step 2 algorithm, we must compute the maximum entropy model $p^{S \cup f}$, a task that is computationally costly even with the efficient iterative scaling algorithm described in the previous discussion on computing the parameters.

In the following pages we describe several modifications which lead to greedier but much more practical algorithms. The first modification is to replace the exorbitant (albeit exact) computation of the gain of a feature of step 2 with an easier-to-compute approximate gain. In this section we describe this approximation in the next section we give an algorithm for computing this approximate gain for a single feature. In the following section, we present an algorithm for efficiently computing the approximate gains of an entire collection of features. The second modification, described in Section below, is to select features in batches, rather than one per iteration. The final modification described in Section below, relates to a more careful selection criterion for the batches of added features.

Recall that to each feature function of our model there corresponds a parameter $\lambda_i$. The model $p^S$ has one parameter for each feature in S, the model $p^{S \cup f}$ has these parameters of $p^S$, plus a single new parameter $\alpha_f$ corresponding to the newly-added feature $f$. Given this structure, we might hope that the optimal $\lambda$-values for the model $p^S$ do not change as we add the feature $f$. Were this true, imposing an additional constraint would require only the mundane task of adjusting the sole parameter $\alpha_f$. Unfortunately, it turns out that when a new constraint is imposed, the values of all the parameters change.

Nevertheless, it is often reasonable to make the approximation that the addition of a new feature $f$ only affects the value of the parameter a corresponding to $f$, leaving the values of the parameters associated with other features unchanged. Under this approximation, the model $p^{S \cup f}$ can be expressed in terms of the model $p^S$ as $$p^{S \cup f}(y|x) = \frac{1}{Z_\alpha(x)} p^S(y|x) e^{\alpha f(x,y)}$$

$$Z_\alpha(x) = \sum_y p^S(y|x) e^{\alpha f(x,y)}$$

The approximate improvement in the log-likelihood of the training data for the model $p^{S \cup f}$ compared to the model $p^S$ is obtained by maximizing the likelihood $L(p^{S \cup f}, p)$ with respect to $\alpha$. This is equivalent to finding the maximum of the approximate gain $$G(\alpha, f) \equiv L(p^{S \cup f}, \tilde{p}) - L(p^S, \tilde{p}) \qquad (15)$$

$$= -\sum_x \tilde{p}(x) \log Z_\alpha(x) + \alpha \tilde{E}[f]$$

We will denote this maximum appropriate gain by $\sim \Delta L$ ($f$):

$$\sim \Delta L(f) = \max_\alpha G(\alpha, f) \qquad (16)$$

It is a much simpler computational task to find $\sim \Delta L(f)$ by solving the single-parameter optimization problem (16) than to find $\Delta L(f)$ by solving the optimization problem for all the parameters of $p^{S \cup f}$. The hope is that a feature $f$ with a large approximate gain $\sim \Delta L(f)$ will also have a large exact gain $\Delta L(f)$.

Computing the Approximate Gain of a Single Feature

We now describe an iterative algorithm for computing $\sim \Delta L(f)$ for a candidate feature $f$. The algorithm constructs a sequence $\{\alpha_n\}$ for which $G(\alpha_n, f)$ converges monotonically to its maximum value $\sim \Delta L(f)$. The algorithm is based on the fact that the maximum of $G(\alpha, f)$ occurs (except in rare cases) at the unique value $\alpha_*$, at which the derivative $G'(\alpha_*, f)$ is zero. To find this zero we apply Newton's iterative root-finding method. An important twist is that we do not use the updates obtained by applying Newton's method directly in the variable $\alpha$. This is because there is no guarantee that $G(\alpha_n, f)$ increases monotonically for such updates. Instead, we use updates derived by applying Newton's method in the variables $e^\alpha$ or $e^{-\alpha}$. A convexity argument shows that for these updates the sequence $G(\alpha_n, f)$ does increase monotonically. We now give some details. The optimal value $\alpha_*$ can be found by solving the equation $G'(\alpha_*, f)=0$. This can be done efficiently by applying Newton's root-finding method. This method computes the solution $\beta_*$ of an equation $g(\beta_*)=0$ iteratively by the recurrence $$\beta_{n+1} = \beta_n - \frac{g(\beta_n)}{g'(\beta_n)}$$

with an appropriate choice for $\beta_0$ and suitable attention paid to the domain of g.

In general, the sequence $g(\beta_n)$ obtained from Newton's method need not converge monotonically. However, it can be shown that[14]

If $g(\beta)$ is decreasing and convex-$\cup$ and $\beta_0 < \beta_*$, then $g(\beta_n)$ increases monotonically.

If $g(\beta)$ is increasing and convex-$\cap$ and $\beta_0 < \beta_*$, then $g(\beta_n)$ increases monotonically.

Recall that a smooth function is convex-$\cup$ if its second derivative is everywhere non-negative, and convex-$\cap$ if its second derivative is everywhere non-positive.

The function $G'(\alpha, f)$ has no particular convexity as a function of $\alpha$. However, it can be shown (by taking derivatives) that $G'(\alpha, f)$ is decreasing and convex-$\cup$ in $e^\alpha$, and is increasing and convex-$\cap$ in $e^{-\alpha}$. Thus, if $\alpha_* > 0$ so that $e^0 > e^{\alpha^*}$, we can apply Newton's method in $e^\alpha$ to obtain a sequence of $\alpha_n$ for which $G'(\alpha_n, f)$ increases monotonically to zero. Similarly, in $\alpha_* < 0$ so that $e^0 < e^{-\alpha_*}$, we can apply Newton's method in $e^{-\alpha}$ to obtain a sequence $\alpha_n$ for which $G'(\alpha_n, f)$ decreases monotonically to zero. In either case, $G(\alpha_n, f)$ increases monotonically to its maximum $G(\alpha_*, f)$.

The updates resulting from Newton's method applied in the variable $\beta = e^{r\alpha}$, for $r=1$ or $r=-1$ are easily computed:

$$\alpha_{n+1} = \alpha_n + \frac{1}{r}\log\left(1 - \frac{1}{r}\frac{G'(\alpha_n, f)}{G''(\alpha_n, f)}\right) \quad (17)$$

We are thus led to

Algorithm 3 Computing the Gain of a Single Feature

Input: Empirical distribution $p(x, y)$; initial model $p^S$; candidate feature $f$ Output: Optimal parameter $\alpha_*$ for feature $f$; maximum approximate gain $\sim \Delta L(f) = G(\alpha_*, f)$ 1. Let $$r = \{1 \quad \tilde{E}[f] \geq E[f]$$
$$= \{-1 \quad \tilde{E}[f] < E[f]$$

2. Set $\alpha_0 \leftarrow 0$
3. Repeat the following until $G(\alpha_n, f)$ has converged
   Compute $\alpha_{n+1}$ from $\alpha_n$ using equation (17)(Z)
   Compute $G(\alpha_{n+1}, f)$ using equation (15)
4. Set $\sim \Delta L(f) \leftarrow G(\alpha_n, f)$ The argument just outlined show that the sequence of $G(\alpha_n, f)$ increases monotonically to the maximum approximate gain $\sim \Delta L(f) \equiv G(\alpha_*, f)$ and that $\alpha_n$ converges monotonically to $\alpha_*$.

Computing the Approximate Gain of a Collection of Features

For the purpose of incremental model growing as outlined in Algorithm 2, we need to compute the maximum approximate gain $\sim \Delta L(f)$ for each candidate feature $f \in F$. One approach is to cycle through all candidate features and apply Algorithm 3 for each one sequentially. Since Algorithm 3 requires one pass through the training data to compute $G(\alpha, f)$ and its derivatives for each iteration, this would require passing through the training data several times for each feature. We now give a parallel algorithm in which, for each pass through the training data, we perform a Newton-update step for each candidate feature. This parallel algorithm is useful for applications in which a significant cost overhead exists for reading the training data; for example, if the training data cannot be stored in memory but must be accessed from disk.

Algorithm 4 Computing Approximate Gains for A Set of Features

Input: Empirical distribution $p(x, y)$; initial model $p^S$; set of candidate features F Output: For each candidate feature $f \in F$, the optimal vote $\alpha_*$ and the maximum approximate gain $\sim \Delta$.

1. For each $f \in F$, calculate the expected value of $f$ in the training data, $E[f]$, according to equation (1).

2. For each x, determine the set $F(x) \subset F$ of those $f$ that are active for x; i.e, $$x) = \{f \in F | f(x, y)p(y|x)\tilde{p}(x) > 0 \text{ for some}$$ (A)

3. For each $f \in F$, initialize $\alpha(f) \leftarrow 0$
4. For each $f$, set $$r(f) = 1 \text{ if } \tilde{E}[f] \leq E[f]$$
$$= -1 \text{ if } \tilde{E}[f] > E[f] \quad (B)$$

5. Repeat the following until $\alpha(f)$ converges for each $f \in F$:
   (a) For each $f \in F$, set
   $G'(f) \leftarrow E[f]$
   $G''(f) \leftarrow 0$
   (b) For each x, do the following:
   For each $f \in F(x)$, Update $G'(f)$ and $G''(f)$ by $$G'(f) \leftarrow G'(f) - \tilde{p}(x)E_{\alpha,x}[f] \quad (18)$$

$$G''(f) \leftarrow G''(f) - \tilde{p}(x)E_{\alpha,x}[f - E_{\alpha,x}[f]]^2 \quad (19)$$

where $E_{\alpha,x} \equiv \Sigma_y p_\alpha(y|x) f(x, y)$
   (c) For each $f \in F$ update $\alpha(f)$ by $$\alpha(f) \to \alpha(f) + \frac{1}{r(f)}\log\left(1 - \frac{1}{r(f)}\frac{G'(f)}{G''(f)}\right) \quad (C)$$

6. For each $f \in F$, substitute $\alpha(f)$ into equation (15) to determine $\sim \Delta L(f)$.

We can imagine incorporating this algorithm into our basic feature selection algorithm, Algorithm 2, to produce an efficient feature selection algorithm. Unfortunately, such an algorithm would still lie on the outer limits of feasibility for today's workstation-class machines.[4] The shortcoming in the algorithm is that each iteration requires calculating the approximate gain of each feature $f \in F$, as well as updating the parameters of the model. Both of these computations are expensive, requiring one or more passes through every event in the training sample.

[4]Experiments we have conducted on a 33 MIPS RS/6000 workstation, for instance, demonstrate that Algorithm 2 incorporating the gain-approximation technique often requires several hours to complete when applied to various modelling tasks related to machine translation.

Batch Feature Selection

In the following pages we describe a second refinement to Algorithm 2—selecting features in batches, rather than one at a time-which results in an order of magnitude speedup in running time. In conjunction with the gain-approximation technique described above, these two refinements lead to a practical version of Algorithm 2.

Naively, one might consider the following cosmetic refinement to Algorithm 2. Rather than selecting in step 2 the one feature $f$ with maximal gain (exact or approximate), select a batch B consisting of the top $|B|$ features, ranked by gain. There is, unfortunately, a flaw with this procedure. Adding features in batches can yield an inefficient model, as will be made clear shortly. This is the price one pays for not having to solve the constrained optimization problem of Algorithm 1 for each added feature.

By definition, $\Delta L(f)=L(p^{S\cup f})-L(p^S)$ is the increase in log-likelihood resulting from adjoining the candidate feature $f$ to S and recomputing $p^S$. By extension, the increase in log-likelihood resulting from adjoining the batch of features B to S all at once is $$L\left(p^{S\cup f_{B_1} \cup f_{B_2} \cup \ldots \cup f_{B_{|B|}}}\right) - (p^S) \quad (20)$$

When selecting a batch of $|B|$ features, our goal is to maximize this expression. However, by selecting a batch of features solely based on $\sim\Delta L(f)$, we are in fact selecting the B which (approximately) maximizes the expression $$L\left(p^{S\cup f_{B_1}}\right) + L\left(p^{S\cup f_{B_2}}\right) + \ldots + L\left(p^{S\cup f_{B_{|B|}}}\right) - |B|L(p^S) \quad (21)$$

These expressions are not the same: the first is the total gain resulting from adding all $f\epsilon B$ simultaneously to S; the second is the sum of the individual gains when each feature is adjoined independently to S. Employing (21) to select batches of features has the following shortcoming. If features $f_1$ and $f_2$ have gains $\Delta L(f_1)$ and $\Delta L(f_2)$, this does not mean the gain from adding both features to S is $\Delta L(f_1)+\Delta L(f_2)$. Depending on how one defines the candidate feature set F, two candidate features might have gains which are non-additive; that is, $\Delta L(f_1)+\Delta L(f_2)=\max_{\Delta L(f_1)}, \Delta L(f_2))$. We call such features redundant. Clearly, we would like to minimize the number of redundant features in our selected batch B. Towards this end, we consider how to determine whether two features $f$ and $f'$ are redundant.

If we had a genie which could determine the degree of redundancy between two candidate features, we could pick out a batch of the top $|B|0$ features, cull from the batch one of each pair of redundant features, and add the remaining features. The resulting algorithm would combine the speed of batch feature selection with the resulting model quality of Algorithm 2.

With a view toward estimating the redundancy between two features, we introduce the random variable $\phi_f(x)$:

$$\phi_f(x) = \begin{cases} 1 & f(x, y) = 1 \text{ for some } y \\ 0 & \text{otherwise} \end{cases}$$

Over the set of training events $(x, y)$, $\phi_f(x)$ assumes the value 1 when $\Sigma_{y\epsilon y} f(x, y)>0$, and 0 elsewhere.

We define the redundancy between features $f$ and $f'$ as $$\rho(f, f') \equiv \frac{\text{Cov}(\phi_f, \phi_{f'})}{\text{Var}(\phi_f)^{1/2}\text{Var}(\phi_{f'})^{1/2}} \quad (22)$$

where we take $\text{Cov}(\phi)$ and $\text{Var}(\phi)$ over the set of training events. The reader may recognize $\rho(f, f')$ as the correlation coefficient between $\phi_f$ and $\phi_{f'}$ having the property that $0 \leq \rho(f, f') \leq 1$. If $f=f'$, $\rho(f, f')=1$, and if $f$ and $f'$ are orthogonal, so that for no $(x, y)$ is it true that $f(x, y)=1$ and $f'(x, y)=1$, then $\rho(f, f')=0$. Clearly, $\rho(f, f')$ is in some sense measuring the same thing as $\Gamma(f, f')$, though only approximately: for one, $\Gamma(f, f')$ is a function of the initial model p and $\rho$ is independent of p.

The quantity $\rho$ has the attractive quality of being rather easy to compute, requiring (in a naive implementation) the storage of those $(x, y)$ for which $f(x, y)=1$ for each $f\epsilon B$.

With a means of quickly gauging the redundancy between two features $f$ and $f'$, we can adapt a batch feature-selection algorithm to be more selective about its batches, discarding those features which exhibit a high level of correlation with other features in the same batch. Not being able to afford the costly computation of $\Gamma(f, f')$ for each $f,f'\epsilon B$, the algorithm relies on the premise that the size of $\rho(f, f')$ is a strong predictor of the size of $\Gamma(f, f')$: if $\rho(f, f')>>0$, $\Gamma(f, f')<<1$. However, the algorithm is robust with respect to a false approximation: if, during the processing of a batch B of features, the algorithm "accidentally" discards a feature $f$ (as a result of overestimating $\Gamma(f, f')$ for some $f'\epsilon B$, that feature has the opportunity to be incorporated in a subsequent batch.

Efficient Feature Selection Algorithm

We now present an efficient algorithm for incrementally constructing a maximum entropy model, incorporating the refinements of the past few pages.

Algorithm 5 Efficient Feature Selection

Input: Set F of candidate features; empirical distribution p(x, y)

Output: Set S of active features, model $p^S$ incorporating these features

1. Start with $S=\{\emptyset\}$; thus $p^S$ is uniform
2. Complete the approximate gain $\sim\Delta L(f)$ for each candidate feature $f\epsilon F$ using Algorithm 4
3. Check the termination condition
4. Select the top $|B|$ features, ranked by decreasing approximate gain:

$B \leftarrow \{f_{B1}, f_{B2}, f_{B3} \ldots f_{B|B|}\}$

4a Set $B'=\{\emptyset\}$
   4b Do for $i=1$ to $|B|$:
     a) Do for $j=1$ to $i-1$:
       If $f_{Bj}$ has already been discarded, continue
       If $\rho(f_i, f_j)<\delta$ for some predefined $\delta$, then $B' \leftarrow B' \cup f_i$
5. Adjoin B' to S the pruned batch
6. Compute $p^S$ using Algorithm 1
8. Go to step 2.

Case Studies

In the next few pages we discuss several applications of maximum entropy modelling within Candide, a fully automatic French-to-English machine translation system under development at IBM. Over the past few years, we have used Candide as a test bed for exploring the efficacy of various techniques in modelling problems arising in machine translation.

We begin with a review of the general theory of statistical translation, describing in some detail the models employed in Candide. We then describe how we have applied maximum entropy modelling to predict the French translation of an English word in context. Subsequently, we describe maximum entropy models that predict differences between French word order and English word order. Finally, we describe a maximum entropy model that predicts how to divide a French sentence into short segments that can be translated sequentially.

Review of Statistical Translation

When presented with a French sentence F, Candide's task is to locate the English sentence E which is most likely given F. That is, the system seeks $$\hat{E} = \underset{E}{\mathrm{argmax}} p(E \mid F) \quad (23)$$

By Bayes' theorem, this problem is equivalent to $$\hat{E} = \underset{E}{\mathrm{argmax}} p(F \mid E) p(E) \quad (24)$$

Candide estimates p(E)—the probability that a string E of English words is a well-formed English sentence—using a parametric model of the English language, commonly referred to as a language model. The system estimates p(F|E)—the probability that a French sentence F is a translation of E—using a parametric model of the process of English-to-French translation known as a translation model. These two models, plus a search strategy for finding the E which maximizes (24) for some F, comprise the engine of the translation system.

Figures 3, 4:
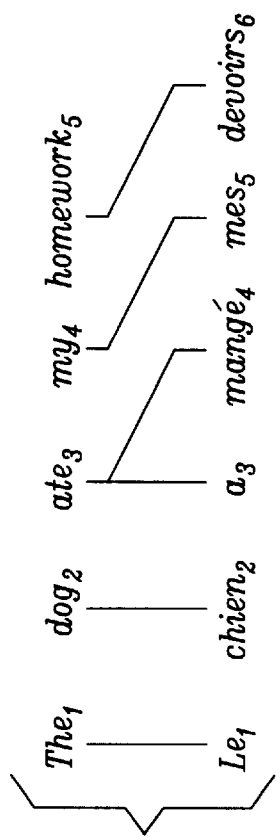
FIG. 3 illustrates an alignment of a French-English sentence pair.
FIG. 4 shows typical errors encountered using an Estimation-Maximization (EM) based model in French-to-English translation resulting from the method of the present invention.

We now briefly describe the translation model for the probability P(F|E). We imagine that an English sentence E generates a French sentence F in two steps. First each word in E independently generates zero or more French words. These words are then ordered to give a French sentence F. We will denote the ith word of E by $e_i$ and the jth word of F by $m_j$. (We employ $m_j$ rather than the more intuitive $f_j$ to avoid confusion with the feature function notation.) We will denote the number of words in the sentence E by |E| and the number of words in the sentence F by |F|. The generative process yields not only F but also an association of the words of F with the words of E. We call this association an alignment, and denote it by A. An alignment A is parameterized by a sequence of |F| numbers with $a_j$, with $1 \leq a_j \leq |E|$. For every word position j in F, $a_j$ is the word position in E of the English word that generates $m_j$. FIG. 3 depicts a typical alignment.

The probability p(F|E) that F is the translation of E is expressed as the sum over all possible alignments A between E and F of the probability of F and A given E:

$$p(F \mid E) = \sum_A p(F, A \mid E) \quad (25)$$

The sum in equation (25) is computationally unwieldy; it involves a sum over all $|E|^{|F|}$ possible alignments between the words in the two sentences. For this reason we sometimes make the simplifying assumption that there exists one extremely probable alignment A, called the "Viterbi alignment," for which $$p(F \mid E) \approx p(F, \hat{A} \mid E) \quad (26)$$

Given some alignment A (Viterbi or otherwise) between E and F, the probability p(F,A|E) is given by $$p(F, A \mid E) = \prod_{i=1}^{|E|} p(n(e_i) \mid e_i) \cdot \prod_{j=1}^{|F|} p(m_j \mid e_{a_j}) \cdot d(A \mid E, F) \quad (27)$$

where $n(e_i)$ denotes the number of French words aligned with $e_i$. In this expression p(n|e) is the probability that the English word e generates n French words, p(m|e) is the probability that the English word e generates the French word m; and d(A|E,F) is the probability of the particular order of French words.

We will call the model described by equations (25) and (27) the Basic Translation Model.

We take the probabilities p(n|e) and p(m|e) as the fundamental parameters of the model, and parameterize the distortion probability in terms of simpler distributions (See, "*Mathematics of Statistical Machine Translation: Parameter Estimation*" appearing in Computational Linguistics, Vol. 19, No. 2, pp 263–311, 1993). Brown et al. describes a method of estimating these parameters to maximize the likelihood of a large bilingual corpus of English and French sentences. Their method is based on the Estimation-Maximization (EM) algorithm, a well-known iterative technique for maximum likelihood training of a model involving hidden statistics. For the basic translation model, the hidden information is the alignment A between E and F.

We employed the EM algorithm to estimate the parameters of the basic translation model so as to maximize the likelihood of a bilingual corpus obtained from the proceedings of the Canadian parliament. For historical reasons, these proceedings are sometimes called "Hansards." Our Hansard corpus contains 3,603,971 English-French sentence pairs, a little under 100 million words in each language. Table 1 shows our parameter estimates for the translation probabilities p(f|in). The basic translation model has worked admirably: Given only the bilingual corpus, with no additional knowledge of the languages or any relation between them, it has uncovered some highly plausible translations.

Nevertheless, the basic translation model has one major shortcoming: it does not take the English context into account. That is, the model does not account for surrounding English words when predicting the appropriate French rendering of an English word. As we pointed out previously, this is not how successful translation works. The best French translation of in is a function of in is a function of the surrounding English words: if a month's time are the subsequent words, pendant might be more likely, but if the fiscal year 1992 are what follows, then dans is more likely. The basic model is blind to context, always assigning a probability of 0.3004 to dans and 0.0044 to pendant. This can result in decoding errors. Examples of two such errors are shown in FIG. 4. In the first example, the system has chosen an English sentence in which the French word supérieures has been rendered as superior when greater or higher is a preferable translation. With no knowledge of context, an expert translator is also quite likely to select superior as the

TABLE 1

| Translation | Probability |
|---|---|
| dans | 0.3004 |
| à | 0.2275 |

TABLE 1-continued

| Translation | Probability |
|---|---|
| de | 0.1428 |
| en | 0.1361 |
| pour | 0.0349 |
| (OTHER) | 0.0290 |
| au cours de | 0.0233 |
| , | 0.0154 |
| sur | 0.0123 |
| par | 0.0101 |
| pendant | 0.0044 |

Most frequent French translations of in as estimated using EM-training. (OTRER) represents a catch-all classifier for any French phrase not listed, none of which had a probability exceeding 0.0043.

TABLE 2

| translation | $e_{-3}$ | $e_{-2}$ | $e_{-1}$ | $e_{+1}$ | $e_{+2}$ | $e_{+3}$ |
|---|---|---|---|---|---|---|
| dans | the | committee | stated | a | letter | to |
| à | work | was | required | respect | of | the |
| au cours de | | | | the | fiscal | year |
| dans | by | the | government | the | same | postal |
| à | of | diphtheria | reported | Canada | , | by |
| de | not | given | notice | the | ordinary | way |

Several actual training events for the maximum entropy translation model for in.

English word which generates supérieures. But if the expert were privy to the fact that 50% was among the next few words, he might be more inclined to select greater or higher. Similarly, in the second example, the incorrect rendering of Il as He might have been avoided had the translation model used the fact that the word following it is appears.

Context-Dependent Word Models

In the hope of rectifying these errors, we consider the problem of context-sensitive modelling of p(m|e). We envision, in practice, a separate maximum entropy model, $p_e(m|x)$, for each English word e, where $p_e(m|x)$ represents the probability that an expert translator would choose m as the French rendering of e, given the surrounding English context x. This is just a slightly recast version of a long-standing problem in computational linguistics, namely sense disambiguation—the determination of a word's sense from its context.

We begin with a training sample of English-French sentence pairs (E,F) randomly extracted from the Hansard corpus, such that E contains the English word in. For each sentence pair, we use the basic translation model to compute the Viterbi alignment A between E and F. Using this alignment, we then construct an (x, y) training event. The event consists of a context x containing the six words in E surrounding in and a future y equal to the French word which is (according to the Viterbi alignment A) aligned with in. A few actual examples of such events for in are depicted in Table 2.

Next we define the set of candidate features. For this application, we employ features that are indicator functions of simply described sets. Specifically, we consider functions $f(x, y)$ as shown in FIGS. 23–24 which are one if y is some particular French word and the context x contains a given English word, and are zero otherwise.

According to FIG. 23, $f_1=1$ when April follows in and en is the translation of in; according to FIG. 23, $f_2=1$ when weeks is one of three words following in and pendant is the translation.

The set of features under consideration is vast, but is expressed in an abbreviated form in Table 3 in FIG. 25, which illustrates feature templates for word-translation modelling, with $|V_E|$ being the size of the English vocabulary, and $|V_F|$ being the size of the French vocabulary. In the table, the symbol ◊ is a placeholder for a possible French word and the symbol □ is placeholder for a possible English word. The feature $f_1$, mentioned above is thus derived from Template 2 with ◊=en and □=April; the feature $f_2$ is derived from Template 5 with ◊=pendant and □=weeks. If there are $|v_E|$ total English words and $|v_F|$ total French words, there are $|v_F|$ type-1 features, and $|v_E| \cdot |v_F|$ features of types 2, 3, 4 and 5.

Template 1 features give rise to constraints that enforce equality between the probability of any French translation m of in according to the model and the probability of that translation in the empirical distribution. Examples of such constraints are E[m=dans]=Ẽ[m=dans]
E[m=à]=Ẽ[m=à]
E[m=de]=Ẽ[m=de]
E[m=en]=Ẽ[m=en]

A maximum entropy model that uses only Template 1 features predicts each French translation m with the probability p(m) determined by the empirical data. This is exactly the distribution employed by the Basic Translation Model.

Since Template 1 features are independent of x, the maximum entropy model which employs only constraints derived from Template 1 features takes no account of contextual information in assigning a probability to m. When we include constraints derived from Template 2 features, we take our first step towards a context-dependent model. Rather than simply constraining the expected probability of a French word m to equal its empirical probability, these constraints require that the expected joint probability of the English word immediately following in and the French rendering of in be equal to its empirical probability. An example of a Template 2 constraint is adant, $e_{+1}$=several]=Ẽ[m=pendant, $e_{+1}$=.

A maximum entropy model incorporating this constraint is able to use the fact that several follows in to influence the probability it assigns to the different possible translations of in. In particular, if in the empirical sample, the presence of several led to a greater probability for pendant this will be reflected in a maximum entropy model incorporating this constraint. Thus we have taken our first step toward context-sensitive translation modelling.

Templates 3, 4 and 5 consider, each in a different way, different parts of the context. For instance, Template 5 constraints allow us to model how an expert translator is biased by the appearance of a word somewhere in the three words following the word he is translating. If house appears within the next three words (as in the phrases in the house and in the red house), then dans might be a more likely translation. On the other hand, if year appears within the same window of words (as in the year 1941 or in that fateful year), then au cours de might be more likely. Together, the five constraint templates allow the model to condition its assignment of probabilities on a window of six words around $e_o$, the word in question.

We constructed a maximum entropy model $p_{in}(m|x)$ by the iterative model-growing method described earlier. The automatic feature selection algorithm first selected a Template 1 constraint for each of the translations of in seen in the sample (12 in all), thus constraining the model's expected probability of each of these translations to their empirical probabilities. The next few constraints selected by the algorithm are shown in Table 4 in FIG. 26, which shows the use of the maximum entropy model to predict a French translation of in. As illustrated in FIG. 26, the features shown are the first non-Template 1 features selected, with [verb marker] denoting a morphological marker inserted to indicated the presence of a verb as the next word. The first column gives the identity of the feature whose expected value is constrained; the second column gives $\sim\Delta L(f)$, the approximate increase in the model's log-likelihood on the data as a result of imposing this constraint; the third column gives L(p, p), the resulting log-likelihood.

Let us consider the fifth row in the table. This constraint requires that the model's expected probability of dans, if one of the three words to the right of in is the word speech, is equal to that in the empirical sample. Before imposing this constraint on the model during the iterative model-growing process, the log-likelihood of the current model on the empirical sample was −2.8703 bits. The feature selection algorithm described earlier calculated that if this constraint were imposed on the model, the log-likelihood would rise by approximately 0.019059 bits; since this value was higher than for any other constraint considered, the constraint was selected. After applying iterative scaling to recompute the parameters of the new model, the likelihood of the empirical sample rose to −2.8525 bits, an increase of 0.0178 bits.

As illustrated in FIG. 27, Table 5 shows the use of the maximum entropy model to predict a French translation of to run, with top-ranked features not from Template 1. Table 5 lists the first few selected features for the model for translating the English word run. The "Hansard flavor"—the rather specific domain of parliamentary discourse related to Canadian affairs—is easy to detect in many of the features in this Table 4.

It is not hard to incorporate the maximum entropy word translation models into a translation model p(F|E) for a French sentence given an English sentence. We merely replace the simple context-independent models p(m|e) used in the basic translation model (27) with the more general context-dependent models p,(m|x):

$$p(F, A \mid E) = \prod_{i=1}^{|E|} p(n(e_i) \mid e_i) \cdot \prod_{j=1}^{|F|} p_{e_{a_j}}(m_j \mid x_{a_j}) \cdot d(A \mid E, F)$$

where $x_{aj}$, denotes the context of the English word $e_{aj}$.

FIG. 5 illustrates how using this improved translation model in the Candide system led to improved translations for the two sample sentences given earlier.

Segmentation

Though an ideal machine translation system could devour input sentences of unrestricted length, a typical stochastic system must split the French sentence into polite lengths before digesting them. If the processing time is exponential in the length of the input passage (as is the case with the Candide system), then not splitting the French sentence into reasonably-sized segments would result in an exponential slowdown in translation.

Thus, a common task in machine translation is to find safe positions at which to split input sentences in order to speed the translation process. "Safe" is a vague term; one might, for instance, reasonably define a safe segmentation as one which results in coherent blocks of words. For our purposes, however, a safe segmentation is dependent on the Viterbi alignment A between the input French sentence F and its English translation E. We define a segmentation as safe if in the Viterbi alignment A, no word in the English sentence E aligned to words in different segments of the French sentence F.

Figure 6:
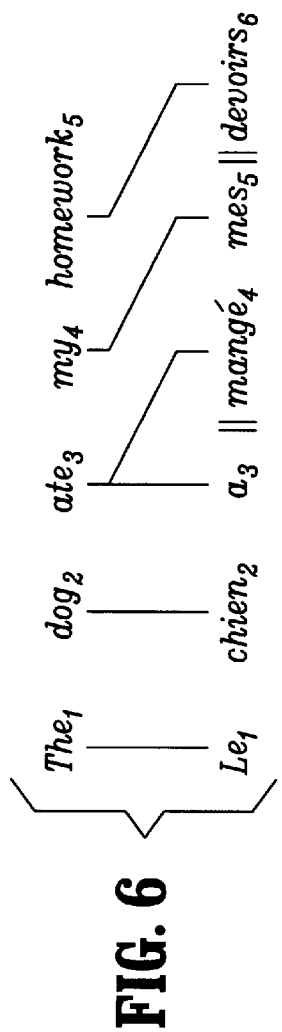
FIG. 6 illustrates an example of an unsafe segmentation.

We define a rift as a position i in E such that for all k<j, $a_k \leq a_j$ and for all k>j, $a_k \geq a_j$. If one were to draw the alignments as in FIG. 3, this condition is met when no lines cross the line connecting $m_j$ and $e_{aj}$. In other words, the words to the left of $m_j$ are generated by words to the left of $e_{aj}$, and the words to the right of $m_j$ are generated by words to the right of $e_{aj}$. In that alignment, there are rifts at positions 1, 2, 4 and 5 in the French sentence. Using our definition of rifts, we can redefine a "safe" segmentation as one in which the segment boundaries are located only at rifts. FIG. 6 illustrates an unsafe segmentation, in which a segment boundary is placed between a and mangé, where there is no rift.

Figure 7:
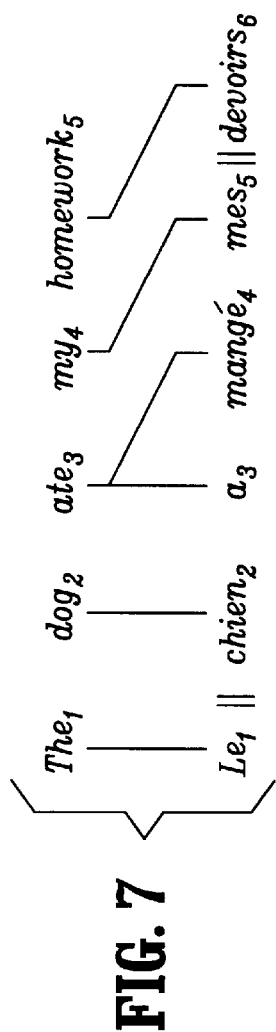
FIG. 7 illustrates an example of a safe segmentation.

FIG. 7, on the other hand, illustrates a safe segmentation. The reader will notice that a safe segmentation does not necessarily result in semantically coherent segments: mes and devoirs are certainly part of one logical unit, yet are separated in this safe segmentation. This is in fact the appropriate behavior for a segmenting module within the statistical machine translation system we have been discussing. Once such a safe segmentation has been applied to the French sentence, we can make the assumption while searching for the appropriate English translation that no one word in the translated English sentence will have to account for French words located in different segments. Disallowing intersegment alignments dramatically reduces the scale of the computation involved in generating a translation, particularly for large sentences. We can consider each segment sequentially while generating the translation, working from left to right in the French sentence.

Figure 8:
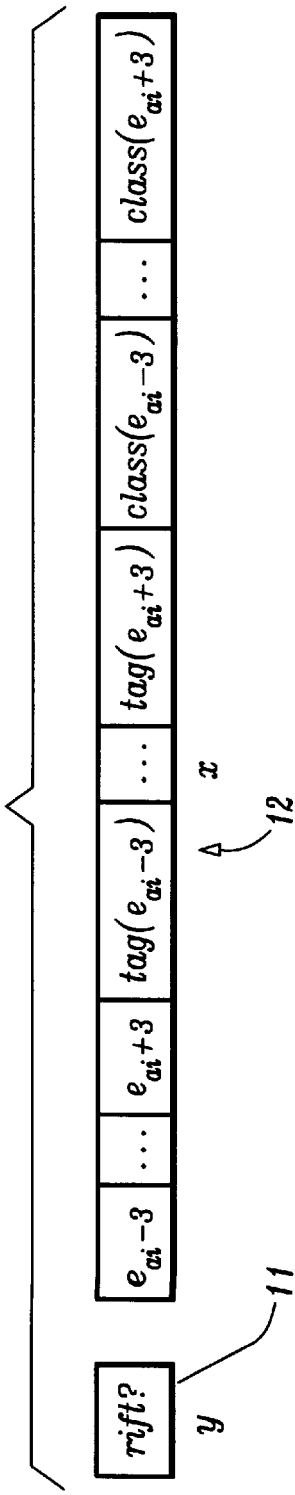
FIG. 8 illustrates x, y pairs for a sentence segmentation.

We now describe a maximum entropy model which assigns to each location in a French sentence a score which is a measure of the safety in cutting the sentence at that location. We begin as in the word translation problem, with a training sample of English-French sentence pairs (E,F) randomly extracted from the Hansard corpus. For each sentence pair we use the basic translation model to compute the Viterbi alignment A between E and F. We also use stochastic part of speech tagger to label each word in F with its part of speech. For each position j in F we then construct a (x, y) training event. The value y in element 11 of FIG. 8 is rift if a rift belongs at position j and is no-rift otherwise. The context information x in element 12 is reminiscent of that employed in the word translation application described earlier. It includes a six-word window of French words, three to the left of $m_j$ and three to the right of $m_j$. It also includes the part-of-speech tags for these words. The complete (x, y) pair in elements 11, 12 is illustrated in FIG. 8.

In creating p(rift|x), we are (at least in principle) modelling the decisions of an expert French segmenter. We have a sample of his work in the aforementioned p(x, y), and we measure the worth of a model by the log-likelihood L(p, p). During the iterative model-growing procedure, the algorithm selects constraints on the basis of how much they increase this objective function. As the algorithm proceeds, more and more constraints are imposed on the model p, bringing it into ever-stricter compliance with the empirical data p(x, y). This is useful to a point; insofar as the empirical data embodies the expert knowledge of the French segmenter, we would like to incorporate this knowledge into a model. But the data contains only so much expert knowledge; the algorithm should terminate when it has extracted this knowledge. Otherwise, the model p(y|x) will begin to fit itself to quirks in the empirical data.

A standard approach in statistical modelling to avoid this problem of "overfitting" the training data is to separate the empirical data p(x, y) into two segments. Call one the training data, denoted by $p_r$, and the other held-out data, denoted by $p_h$. We will use only $p_r$, in the model-growing process; that is, we will select features based on how much they increase the likelihood $L(p, p_r)$. As the algorithm progresses, $L(p, p_r)$ will thus increase monotonically. As long as each new constraint imposed allows p to better account for the random process which generated both $p_r$, and $p_h$, the quantity $L(p, p_h)$ will also increase. At the point when overfitting begins, however, the new constraints no longer help p model the random process, but will instead require p to model the noise in the sample $p_r$, itself. At this point, $L(p, p_r)$ continues to rise, but $L(p, p_h)$ no longer does. It is at this point that the algorithm should terminate.

Figure 9:
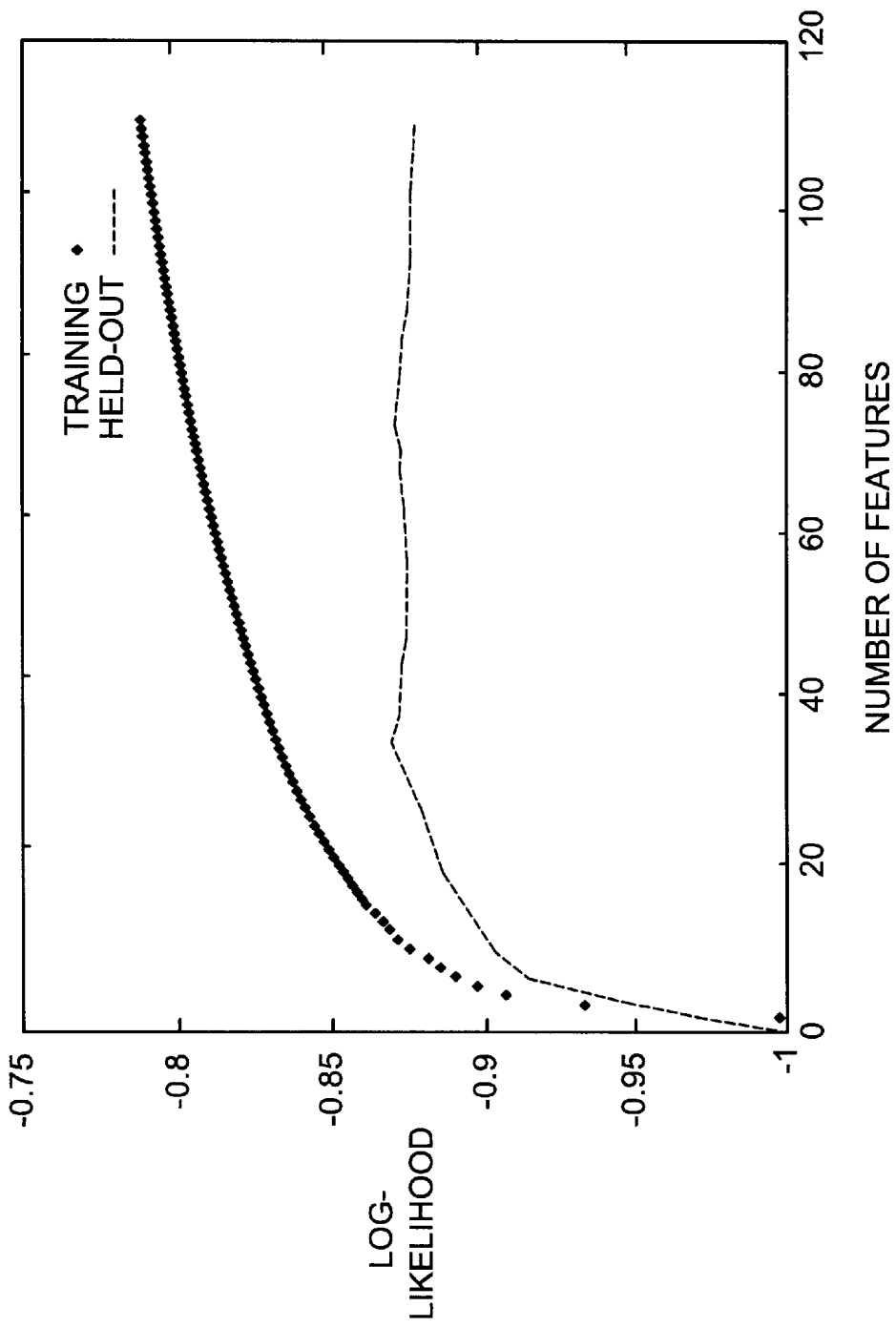
FIG. 9 illustrates the change in log-likelihood during segmenting model-growing.

FIG. 9 illustrates the change in log-likelihood of training data $L(p, p_r)$ and held-out data $L(p, p_h)$. Had the algorithm terminated when the log-likelihood of the held-out data stopped increasing, the final model p would contain slightly less than 40 features.

We have employed this segmenting model as a component in a French-English machine translation system in the following manner. The model assigns to each position in the French sentence a score, p(rift), which is a measure of how appropriate a split would be at that location. A dynamic programming algorithm then selects, given the "appropriateness" score at each position and the requirement that no segment may contain more than 10 words, an optimal (or, at least, reasonable) splitting of the sentence. FIG. 10 shows the system's segmentation of four sentences selected at random from the Hansard data. We remind the reader to keep in mind when evaluating FIG. 10 that the segmenter's task is not to produce logically coherent blocks of words, but to divide the sentence into blocks which can be translated independently of one another, in a left-to-right manner.

TABLE 6

| French | English |
|---|---|
| somme d'argent | sum of money |
| pays d'ongin | country of origin |
| guesuon de privilege | question of privilege |
| conflit d'intérêt | conflict of interest |
| bureau de poste | post office |
| taux d'intérêt | interest rate |
| compagnie d'assurance | insurance company |
| gardien de prison | prison guard |

NOUN de NOUN phrases and their English equivalents

Word Reordering

Translating a French sentence into English involves not only selecting appropriate English renderings of the words in the French sentence, but also selecting a word order for the English words. This order is often very different from the French word order. In Candide, word-order differences are captured by allowing alignments with crossing lines. Candide also performs, during a pre-processing stage, a word reordering step which shuffles the words in the input French sentence into an order more closely resembling English word order.

One component of this word reordering step deals with French phrases of the form NOUN de NOUN. For some NOUN de NOUN phrases, the best English translation is nearly word for word. For example conflit d'intérêt is almost always rendered as conflict of interest. For other phrases, however, the best translation is obtained by interchanging the two nouns and dropping the de. The French phrase taux d'intérêt, for example, is best rendered as interest rate. Table 6 gives several examples of NOUN de NOUN phrases together with their English translations.

In this section we describe a maximum entropy model which, given a French NOUN de NOUN phrase, estimates the probability that the best English translation involves an interchange of the two nouns. We begin with a sample of English-French sentence pairs (E,F) randomly extracted from the Hansard corpus, such that F contains a NOUN de NOUN phrase. For each sentence pair we use the basic translation model to compute the Viterbi alignment A between E and F. Using A construct an (x, y) training event as follows. We let the context x be the pair of the two French nouns ($NOUN_L$, $NOUN_R$). We let y be no-interchange if the English translation is a word-for-word translation of the French phrase and we let y=interchange if the order of the nouns in the English and French phrases are interchanged.

We define candidate features based upon the template features shown in Table 7. In this table, the symbol ◊ is a placehold for either interchange or no-interchange and the symbols

TABLE 7

| Template Number | Number of actual features | f(x,y) = 1 if and only if... |
|---|---|---|
| 1 | $2|v_r|$ | y = ◊ and $NOUN_L$ = □ |
| 2 | $2|v_r|$ | y = ◊ and $NOUN_B$ = □ |
| 3 | $2|v_r|$ | y = ◊ and $NOUN_L$ = $□_1$ and $NOUN_B$ = $□_2$ |

Template Features for NOUN de NOUN maximum entropy model.

$□_1$ and $□_2$ are placeholders for possible French words. If there are $|v_F|$ total French words, there are $2|v_F|$ possible features of types 1 and 2 and $2|v_F|^2$ features of types 3.

Template 1 features consider only the left noun. We expect these features to be relevant when the decision of whether to interchange the nouns is influenced by the identity of the left noun. For example, including the Template 1 feature $$f(x, y) = \begin{cases} 1 & y = \text{interchange and } NOUN_L = \text{système} \\ 0 & \text{otherwise} \end{cases}$$

gives the model sensitivity to the fact that the nouns in French phrases NOUN de NOUN which begin système (such as système de surveillance and système de quota) are more likely to be interchanged in the English translation. Similarly, including the Template 1 feature $$f(x, y) = \begin{cases} 1 & y = \text{no-interchange and } NOUN_L = \text{mois} \\ 0 & \text{otherwise} \end{cases}$$

gives the model sensitivity to the fact that French NOUN de NOUN phrases which begin with mois, such as mois de mai (month of May) are more likely to be translated word for word.

Template 3 features are useful in dealing with translating NOUN de NOUN phrases in which the interchange decision is influenced by the pair of nouns. For example, NOUN de NOUN phrases ending in interet are sometimes translated word for word, as in conflit d'intérêt (conflict of interest) and are sometimes interchanged, as in taux d'intérêt (interest rate).

We used the modeling-growing algorithm 5 to construct a maximum entropy model from candidate features derived from Templates 1, 2 and 3. The model was grown on 10,000 training events randomly selected from the Hansard corpus. The final model contained 358 constraints.

To test the model, we constructed a NOUN de NOUN word-reordering module which interchanges the order of the nouns if p(interchange)>0.5 and keeps the order the same otherwise. Table 8 compares performance on heldout test data of this module against a baseline NOUN de NOUN reordering module which never swaps the word order.

Table 9 shows some randomly-chosen NOUN de NOUN phrases extracted from this test suite along with p(interchange|x), the probability which the model assigned to inversion.

TABLE 8

| Test data | Simple Model Accuracy | Maximum Entropy Model Accuracy |
|---|---|---|
| 50,229 not interchanged | 100% | 93.5% |
| 21,326 interchanged | 0% | 49.2% |
| 71,555 total | 70.2% | 80.4% |

NOUN de NOUN model performance: simple approach vs. maximum entropy

At the top of the chart are phrases such as saison d'hiver for which the model strongly predicted an inversion. At the bottom are phrases which the model strongly prefers not to interchange, such as somme d'argent, abus de privilège and chambre de commerce. Perhaps most intriguing are those phrases which lie in the middle, such as taux d'inflation, which can translate either to inflation rate or rate of inflation.

Conclusion

We introduced the two main ingredients in maximum entropy modeling-binary-valued features and constraints built from these features—[in section 3]. Given a set of such constraints, the task of selecting a model which satisfies these constraints was our next concern. For this purpose, we introduced the parametric form of the model, which is an exponential model with one adjustable/parameter for each constraint. Given this particular form of the model, the task of modeling is thus reduced to finding the optimum set of parameters. One very appealing aspect of this approach-finding the optimum set of parameters for the exponential form—is that two different philosophical approaches yield the same result: the set of parameters which maximizes the entropy of the model is the same set of parameters which yields the exponential model which best predicts the sample of data from which the parameters were estimated. We then discussed algorithms for constructing maximum entropy models, concentrating our attention on the two main problems facing would-be modelers: selecting a set of features to include in a model, and computing the parameters of a model which contains these features.

The second half of our discussion focused on a series of applications of this method; all of these applications are components in the latest version of Candide, an automatic machine-translation system under development at IBM. The case studies are not meant as a demonstration of a mature technology, nor an illustration of a decisive improvement over existing modeling techniques, but merely a proof of concept of a means of performing context-sensitive modeling without an explosion of parameters.

TABLE 9

| Phrase | |
|---|---|
| saison d'hiver | 0.997 |
| taux de base | 0.922 |
| plan d'urgence | 0.911 |
| system de surveillance | 0.851 |
| burea de poste | 0.845 |
| taux de d'intérêt | 0.724 |
| système de gota | 0.723 |
| coût de transport | 0.555 |
| tatL d'inflation | 0.440 |
| ficelle d'emballage | 0.375 |
| déclaration de candidature | 0.254 |
| nivea d'inflation | 0.224 |
| construction d'habitation | 0.206 |
| acquisition de terre | 0.195 |
| état de santé | 0.167 |
| quantitéde pétrole | 0.080 |
| mois de mai | 0.043 |
| genre de travail | 0.032 |
| somme d'argent | 0.018 |
| abus de privilège | 0.012 |
| chambre de commerce | 0.006 |

Performance of the NOUN de NOUN interchanger

Section A

The Danger of Implicit Constraints

In describing a basic feature selection algorithm with reference to FIG. 2, we discussed methods for selecting an appropriate subset of features to include in a model. Here we elaborate on why selecting all features which manifest themselves often enough in the empirical sample is not an adequate scheme.

We illustrate the problem with an example. As usual, we take up the task of translating in to French, given a 10-word context x. Suppose we have at our disposal an empirical sample of 2000 instances of an expert's translations. We define feature functions $f_1$, $f_2$ and $f_{1\cup 2}$ as $$f_1(x, y) = \{1 \text{ if } y = dans \text{ and } x_7 = the$$
$$\{0 \text{ otherwise}$$

$$f_2(x, y) = \{1 \text{ if } y = en \text{ and } x_1 = rhinoceros$$
$$\{0 \text{ otherwise}$$

$$f_{1\cup 2} = \{1 \text{ if } y = dans \text{ and } x_7 = the)$$
$$\text{ or } (y = en \text{ and } x_1 = rhinoceros)$$
$$\{0 \text{ otherwise}$$

Suppose that in the sample, the feature $f_{1\cup 2}$ evaluates to 1 exactly 1000 times, and the event $f_2$ evaluates to 1 only once. The feature $f_{1\cup 2}$ thus evaluates to 1 exactly 1001 times. The constraints corresponding to these features are:

$E_p[f_1]=1000/2000$ $E_p[f_1]=1/2$ $E_p[f_{1\cup 2}]=1001/2000$

If we incorporate all constraints whose corresponding features evaluate to 1 often enough in the data, then incorporating $f_1$, forces us to take $f_{1\cup 2}$ as well. However, taking $f_{1\cup 2}$ along with $f_1$, implicitly constrains the expected probability of $f_2$ to be 1/2000. But the latter is not a constraint we wish to be present in our model; we have only seen the feature $f_2$ one time in the empirical sample, and (as we have argued) we have little basis for concluding that 1/2000 is the proper value to which to constrain the probability of this feature.

Clearly the "evaluates to 1 often enough" criterion will not suffice for determining membership in S.

A Proof of Convergence of Algorithm 1

In discussing the computation of parameters, we described an iterative scaling algorithm (Algorithm 1) for computing the maximum likelihood exponential distribution. The algorithm generalizes the iterative scaling procedure of Darroch and Ratcliff by removing the requirement that the feature functions sum to a constant (See, *"Generalized Iterative Scaling for Log-Linear Models"*, by J. N. Darroch and D. Ratcliff, appearing in The Annals of Mathematical Statistics, Vol. 43, No. 5, pp. 1470–1480, 1972.

We present here a self-contained proof of the monotonicity and convergence of the improved algorithm. For simplicity we will deal with unconditional probability distributions. The proof for conditional distributions is similar. The key idea of the proof is to express the incremental step of the algorithm in terms of an auxiliary function which bounds from below the likelihood objective function. This technique is the standard means of analyzing the EM algorithm, but it has not previously been applied to iterative scaling. Our analysis of iterative scaling is different and simpler than previous treatments. In particular, in contrast to Csiszar's proof of the Darroch-Ratcliff procedure (See, *A Geometric Interpretation of Darroch & Ratcliff's Generalized Iterative Scaling*, by I. Csiszár, appearing in The Annals of Statistics, Vol. 17, No. 3, pp. 1409–1413, 1989), our proof does not rely upon convergence of alternating I-projection (See, *"I-Divergence Geometry of Probability Distributions and Minimization Problems"*, by I. Csiszár, appearing in The Annals of Probability, Vol. 3, No. 1, pp. 146–158, 1975).

This section is organized as follows. In the following section, we present two optimization problems: a maximum likelihood problem for a exponential distribution and a maximum entropy problem subject to linear constraints. In the next section, we prove the basic duality theorem which states that these problems have the same solution. We then turn to the task of computing this solution. In the subsequent section, we introduce auxiliary functions in a general setting, and then in the final section we use auxiliary functions to prove convergence of the Improved Iterative Scaling algorithm.

Two Optimization Problems

Let $\Omega$ be a finite set and let $\Delta$ be the simplex of probability distributions on $\Omega$. We imagine that we are given
1. Training samples drawn from fl with empirical distribution P E A
2. An initial probability distribution go E A
3. A feature function $f: \Omega \to R^n$ We wish to construct a probability distributions $p_* \in \Delta \Delta$ that accounts for these data, in the sense that it approximates p but does not deviate too far from $q_0$. We measure distance between probability distributions p and q in $\Delta$ using the Kullback-Liebler divergence $$D(p, q) = \sum_y p(y) \log \frac{p(y)}{q(y)} \qquad (28)$$

There are two natural sets of probability distributions determined by the data p, $q_0$, and $f$. The first is the set P of all distributions that agree with p as to the expected value of the feature function $f$:

$$P=\{p\in\Delta : p[f]=\tilde{p}[f]\}$$

Here and in the remainder of this section we use the notation $p[f]$ to denote the expected value of the feature function $f$ with respect to the probability distribution p. The second is the set Q of exponential distributions based on go with feature function $f$:

$$P=\{p\in\Delta : p[f]=\tilde{p}[f]\}$$

Here, for $\lambda \in R^n$ and $q\in\Delta$, we define the distribution $\lambda \cdot q \in \Delta$ by $$(\lambda \cdot q)(y) = \frac{1}{Z(q,\lambda)} q(y) \exp \lambda \cdot f(y)$$

where $Z(q, \lambda)$ is a normalization constant determined by the requirement that $\lambda \cdot q(y)$ sums to 1 over y. "Are let Q denote the closure of Q in $\Delta$.

There are two natural criteria for choosing $p_*$:

Maximum Likelihood Exponential Distribution:
  Choose $p_*$ to a distribution in Q with maximum likelihood with respect to p:

$$p_* = \underset{q\in\overline{Q}}{\mathrm{argmin}} D(\tilde{p}, q)$$

Maximum Entropy Constrained Distribution:
  Choose $p_*$ to be a distribution in P that has maximum entropy relative to $q_0$ $$p_* = \underset{p\in P}{\mathrm{argmin}} D(p, q_o)$$

Although these criteria are different, they determine the same distribution, as we prove in the next section.

Duality

In this section we will prove
Proposition 1
  There exists a unique $p_* \in \Delta$ satisfying 1. $p.68 \; P\cap\overline{Q}q)=D(p, p_*)+D(p_*, q)$ for any $p\in P$ 3. $p_* = \underset{q\in\overline{Q}}{\mathrm{argmin}} D(\tilde{p}, q)$ 4. $p_* = \underset{p\in P}{\mathrm{argmin}} D(p, q_o)$ Moreover, any of these four properties determines $p_*$ uniquely.

This result is well known, although perhaps not quite in this packaging. In the language of constrained optimization, it expresses the fact that the maximum likelihood problem for exponential distributions is the convex dual to the maximum entropy problem for linear constraints. We include a proof here to make this discussion self-contained and also to carefully address the technical issues arising from the fact that Q is not closed. The proposition would not be true if we replaced $\overline{Q}$ with Q. In fact, $P\cap Q$ might be empty. Our proof is elementary and does not rely on the Kuhn-Tacker theorem or other machinery of constrained optimization.

Our proof of the proposition will use a few lemmas. The first two lemmas we state without proof.

Lemma 1

1. $D(p, q)$ is a continuious, non-negative, extended real-valued function on $\Delta \times \Delta$ which is smooth at points $(p, q)$ where it is finite
2. $D(p, q)=0$ if and only if $p=q$
3. $D(p, q)$ is strictly convex in $p$ and $q$ separately Lemma 2

1. The map $p \to \lambda \cdot p$ defines a smooth action of $R^n$ on $\Delta$
2. The derivative of $D(p, \lambda \cdot q)$ with respect to $\lambda$ is $$\left.\frac{d}{dt}\right|_{t=0} D(p, t\lambda \cdot q) = \lambda \cdot (p[f] - q[f])$$

Lemma 3

$P \cap Q$ is nonempty

Proof: Define $p_*$ by property (3) of Proposition 1; i.e. $p_* = \mathrm{argmin}_{q \in Q} D(p, q)$. This makes sense since $Q$ is closed and $D(p, q)$ is continuous and strictly convex as a function of $q$. Clearly $p_*$ is in $Q$; we will show that $p_*$ is also in $P$. Since $Q$ is closed under $R^n$, $\lambda \cdot p_*$ is in the action of $R^n$, $\lambda \cdot p_*$ is in $Q$ for any $\lambda$. Thus by the definition of $p_*$, $\lambda = 0$ is a minimum of the function $\lambda \to D(p, \lambda \cdot p_*)$. Taking derivatives with respect to $\lambda$ and using Lemma 2 we conclude $p_*[f] = p[f]$. Thus $p_* \in P$ ·□

Lemma 4

If $p_* \in P \cap Q$ then for any $p \in P$ and $q \in Q$ $$D(p, q) = D(p, p_*) + D(p_*, q)$$

This property is called the Pythagorean property since it resembles Pythagorean's theorem if we imagine that $D(p, q)$ is the square of Euclidean distance and $p_*$ is the vertex of a right triangle.

Proof: A straightforward calculation shows that $$D(p_1, q_2) - D(p_2, q_1) + D(p_1, q_2) = \lambda \cdot (p_1[$$

for any $P_1$, $P_2$, $q_1$, $q_2 \in \Delta$ with $q_2 = \lambda \cdot q_1$. It follows from this identity and the continuity of $D$ that $$D(p_1, q_1) - D(p_1, q_2) - D(p_2, q_1) + D(p_2, q_2) = 0$$

if $p_1, p_2 \in P$ and $q_1, q_2 \in Q$. The lemma follows by taking $p_1 = q_1$, $p_* \cdot \square$ Proof of Proposition 1: Choose $p_*$ to be any point in $P \cap Q$. Such a $p_*$ exists by Lemma 3. It satisfies property (1) by definition, and it satisfies property (2) by Lemma 4. As a consequence of property (2), it also satisfies properties (3) and (4). To check property (3), for instance, note that if q is any point in Q then $D(p, q) = D(p, p_*) + D(p_*, q) \geq D(p_*, q)$.

It remains to prove that each of the four properties (1)–(4) determines $p_*$ uniquely. In other words, we need to show that if $m$ is any point in $\Delta$ satisfying any of the four properties (1)–(4), then $m = p_*$. Suppose that $m$ satisfies property (1). Then by property (2) for $p_*$ with $p=q=m$, $D(m, m)=D(m, p_*)+D(p_*, m)$. Since $D(m, m)=0$, it follows that $D(m, p_*)=0$ so $m=p_*$. If $m$ satisfies property (2), then the same argument with $p_*$ and $m$ reversed again proves that $m=p_*$. Suppose that $m$ satisfies property (3). Then $$D(\tilde{p}, p_*) \geq D(\tilde{p}, m) = D(\tilde{p}, p_*) + D(p_*, m)$$

where the second equality follows from property (2) for $p_*$. Thus $D(p_*, m) \leq 0$ so $m = p_*$. If m satisfies property (4) then a similar proof shows that once again $m = p_* \cdot \square$

Auxiliary Functions

In the previous section we proved the existence of a unique probability distribution $p_*$ that is both a maximum likelihood exponential distributions and a maximum entropy constrained distribution. We now turn to the task of computing $p_*$. Fix $p$ and let $L: \Delta \to R$ be the log-likelihood objective function $$L(q) = -D(\tilde{p}, q)$$

Definition 1

The function $A: \Delta \times R^n \to R$ is an auxiliary function for L if

1. For all $q \in \Delta$ and $\gamma \in R^n$ $$L(\gamma \cdot q) \geq L(q) + A(q, \gamma)$$

2. $A(q, \gamma)$ is continuous in $q \in \Delta$ and $C^I$ in $\gamma \in R^n$ with $$0) = 0 \quad \left.\frac{d}{dt}\right|_{t=0} A(q, t\gamma) = \left.\frac{d}{dt}\right|_{t=0} L(t \cdot$$

We can use an auxiliary function $A$ to construct an iterative algorithm for maximizing L. We start with $q^{(n)} = q_0$ and recursively define $q^{(n+1)}$ by $${}^{+1)} = \gamma^{(n)} \cdot q^{(n)} \quad \text{with} \quad \gamma^{(n)} = \mathrm{argmax}_\gamma A(q^{(n)},$$

It is clear from property (1) of the definition that each step of this procedure increases L. The following proposition implies that in fact the sequence $q^{(n)}$ will reach the maximum of L.

Proposition 2

Suppose $q^{(n)}$ is any sequence in $\Delta$ with $$q^{(0)} = q_0 \quad q^{(n+1)} = \gamma^{(n)} \cdot q^{(n)}$$

where $\gamma^{(n)}$ satisfies $$A(q^{(n)}, \gamma^{(n)}) \geq \epsilon \max_\gamma A(q^{(n)}, \gamma) \qquad (29)$$

for some fixed $\epsilon > 0$. Then $L(q^{(n)})$ increases monotonically $\max_{q \in \bar{Q}}$ 2. $q^{(n)}$ converges $p_* = \mathrm{argmax}_{q \in \bar{Q}} L(q)$ Note that we have replaced the condition that $\gamma^{(n)}$ maximizes $A(q^{(n)}, \gamma)$ by the relaxed condition involving $\epsilon$. This generalization is needed since the maximum in $\gamma$ of $A(q, \gamma)$ might not be achieved at any finite $\gamma$, whereas the weakened condition can always be satisfied if $A(q, \gamma)$ is bounded above.

To use the proposition to construct a practical algorithm we must determine an auxiliary function $A(q, \gamma)$ for which $\gamma^{(n)}$ satisfying the required condition can be determined efficiently. In the next section we present a choice of auxiliary function which yields the Improved Iterative Scaling updates.

We begin with several lemmas.

Lemma 5

If $m$ is a cluster point of $q^{(n)}$ then $A(m, \gamma) \leq 0$ for all $\gamma \in R^n$ Proof: Let $q^{(n(k))}$ be a sub-sequence converging to m. Then for any $\gamma$ $$\epsilon A(q^{(n(k))}, \gamma) \leq A(q^{(n(k))}, \gamma^{(n(k))}) \leq L(q^{(n(k)+1)}) - L(q^{(n(k))}) \leq L(q^{(n(k+1))}) - L(q^{(n(k))})$$

The first inequity follows from property 29 of $\gamma^{(n(k))}$. The second and third inequalities are a consequence of the monotonicity of $L(q^{(n)})$. The lemma follows by taking limits and using the fact that L and A are continuous.□

Lemma 6

If m is a cluster point of $q^{(n)}$, then $$\frac{d}{dt}\bigg|_{t=0} L((t\gamma) \cdot m) \text{ for any } \gamma \in R^n$$

Proof: By the previous lemma, $A(m, \gamma) \leq 0$ for all $\gamma$. Since $A(m,0)$, this means that $\gamma = 0$ is a maximum of $A(m,\gamma)$ so that $$0 = \frac{d}{dt}\bigg|_{t=0} A(m, t\gamma) = \frac{d}{dt}\bigg|_{t=0} L((t\gamma) \cdot q)$$

Lemma 7

Suppose $\{q^{(n)}\}$ is any sequence with only one cluster point $q_*$. Then $q^{(n)}$ converges to $q_*$.

Proof: Suppose not. Then there exists an open set B containing $q_*$ and a subsequence $q^{(n(k))} \notin B$. Since $\Delta$ is compact, $q^{(n(k))}$ has a cluster point $q'_*$. Clearly $q'_* \notin B$. But by assumption, $q'_* = q_* \in B$. □

Proof of Proposition 2: Suppose that m is a cluster point of $q^{(n)}$. Then, $$\frac{d}{dt}\bigg|_{t=0} L((t\gamma) \cdot q) = 0$$

by Lemma 6, and so $m \in P \cap Q$ by Proposition 2. But $p_*$ is the only point in $P \cap Q$ by Proposition 1. It follows from Lemma 7 that $q^{(n)}$ converges to $p_*$. □

Improved Iterative Scaling

In this section we prove the monotonicity and convergence of the Improved Iterative Scaling algorithm by applying Proposition 3 to a particular choice of auxiliary function.

The algorithm requires that each component of the feature function $f$ is nonnegative:

$f_i(y) \geq 0$ for all i and all y

This condition is also needed by the Darroch-Ratcliff algorithm. Define $$f(y) = \sum_i f_i(y)$$

In contrast to the Darroch-Ratclifff algorithm, which requires that $f^\#(y)$ is constant independent of y, the improved algorithm places no restriction on $f^\#(y)$.

Our main result is

Proposition 3

Suppose $q^{(n)}$ is a sequence in $\Delta$ with $q^{(0)} = q_0$ and $q^{(n+1)} = \gamma^{(n)} \cdot q^{(n)}$ such that $^{(n)}(y)f_i(y) \exp \gamma^{(n)}_i f(y) = \tilde{p}[f]$ for each Then $L(q^{(n)})$ increases monotonically to $L(p_*)$ and $q^{(n)}$ converges to $p_*$.

We prove the Proposition by showing that the updates $\gamma^{(n)}$ are derived from an auxiliary function.

Lemma 8

Define $$= -\sum_i \sum_y q(y) f(i|y)(\exp \gamma_i f(y) - 1) +$$

where $f(i|y) = \frac{f_i(y)}{f(y)}$.

Then $A(q, \gamma)$ is an auxiliary function for $L(q)$

Proposition 3 follows immediately from the lemma and Proposition 2. Indeed, it is easy to check that $\gamma^{(n)}$ defined in Proposition 3 achieves the maximum of $A(q^{(n)}, \gamma)$, so that it satisfies the condition of Proposition 2 with $\epsilon = 1$.

The key ingredient in the proof of the lemma is the $\cap$-convexity of the logarithm and the $\cup$-convexity of the exponential, as expressed in Jensen's inequalities $$\exp\sum_i t_i \alpha_i \leq \sum_i \exp \alpha_i \text{ if } t_i \geq 0 \text{ with } \sum_i t_i = \log x \leq x - 1 \text{ for all } x > 0$$

Proof of Lemma 8: Property (2) of Definition 1 is straightforward to verify. To prove property (1) note $$-L(\gamma \cdot q) = \log \sum_y q(y) \exp \gamma \cdot f(y) - \gamma \cdot i \quad (30)$$

$$= \log \sum_y q(y) \exp \sum_i \gamma_i f(y) f(i|y) - \gamma \cdot \tilde{p}[f]$$

$$\sum_y q(y) \exp \sum_i \gamma_i f(y) f(i|y) - 1 - \gamma \cdot \tilde{p}$$

$$\sum_y q(y) \sum f(i|y) \exp \gamma_i f(y) - 1 - \gamma \cdot \tilde{p} = -A(q, \gamma)$$

Equality (30) is a simple calculation. Equality (30) follows from the definition of $f^\#$. Inequalities (30) and (30) follow from Jensen's inequality. □

Explanation of FIGS. 15–22

In broad terms, the goal of this work is to construct a statistical model of a stochastic process. The process could be the number of clubs I receive in each round of a poker game in Atlantic City. It could be the weather over a summer in New York City. Since we are concerned with the applications of statistical modelling to automatic machine translation of a source language into a target language, here's a more relevant example: the process could be the decision of an expert (human) French-to-English translator as he comes up with the proper English rendering of a French word in context. Or it could be a bit (i.e. 1 or 0) reflecting whether two nouns in a French NOUN de NOUN phrase were reversed in the human expert's translation of the phrase (i.e. bureau de poste—post office, but chambre de commerce—chamber of commerce).

We construct a statistical model of the process in the following way. First, we collect a large number of examples of the behavior of the stochastic process. For the last example given above, we might collect the following data:

| | |
|---|---|
| somme de argent | not flipped |
| saison d'hiver | flipped |
| abus de priviledge | not flipped |
| taux de base | flipped |

The next step is to settle a set of candidate features exhibited—or not exhibited—by the output of the stochastic process. A feature might be something like: hiver was the second noun and the decision was to flip. The goal of the model-growing process is to select a useful subset of the full set of features (the active set), and combine these features into a statistical model of the process. Denoting the candidate feature set by F and the active feature set by S the point of this work is Find an optimal S ⊂ F Use the set S to create a statistical model of the process It turns out that there is a difficulty associated with just selecting S all at once (cf. the beginning of the section on feature selection in the paper). Better is to select S incrementally. Most of the diagrams in FIGS. 15–22 concern themselves with increasingly more efficient ways of selecting S incrementally.

Figure 15:
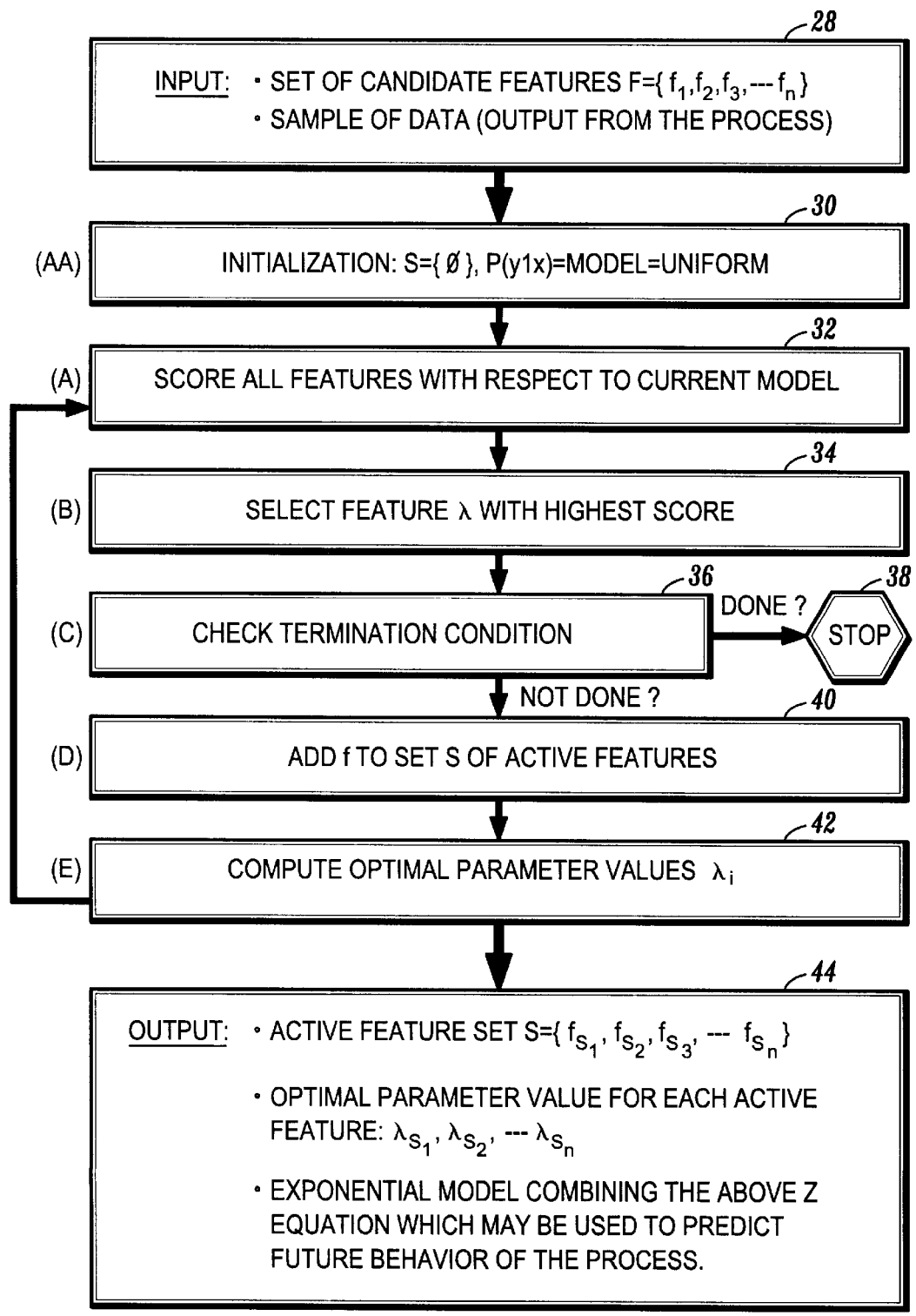
FIG. 15 is a flow diagram describing the process of constructing an exponential model.

FIG. 15 illustrates an incremental construction of an exponential model: This is the very top level diagram, encapsulating the entire process under consideration. The input is:

Sample of data: a large number of examples of the behavior of the stochastic process.

Set of Candidate Features: a predefined set of features of the form described above. Features are really binary-valued functions (with a yes/no answer).

Figure 16:
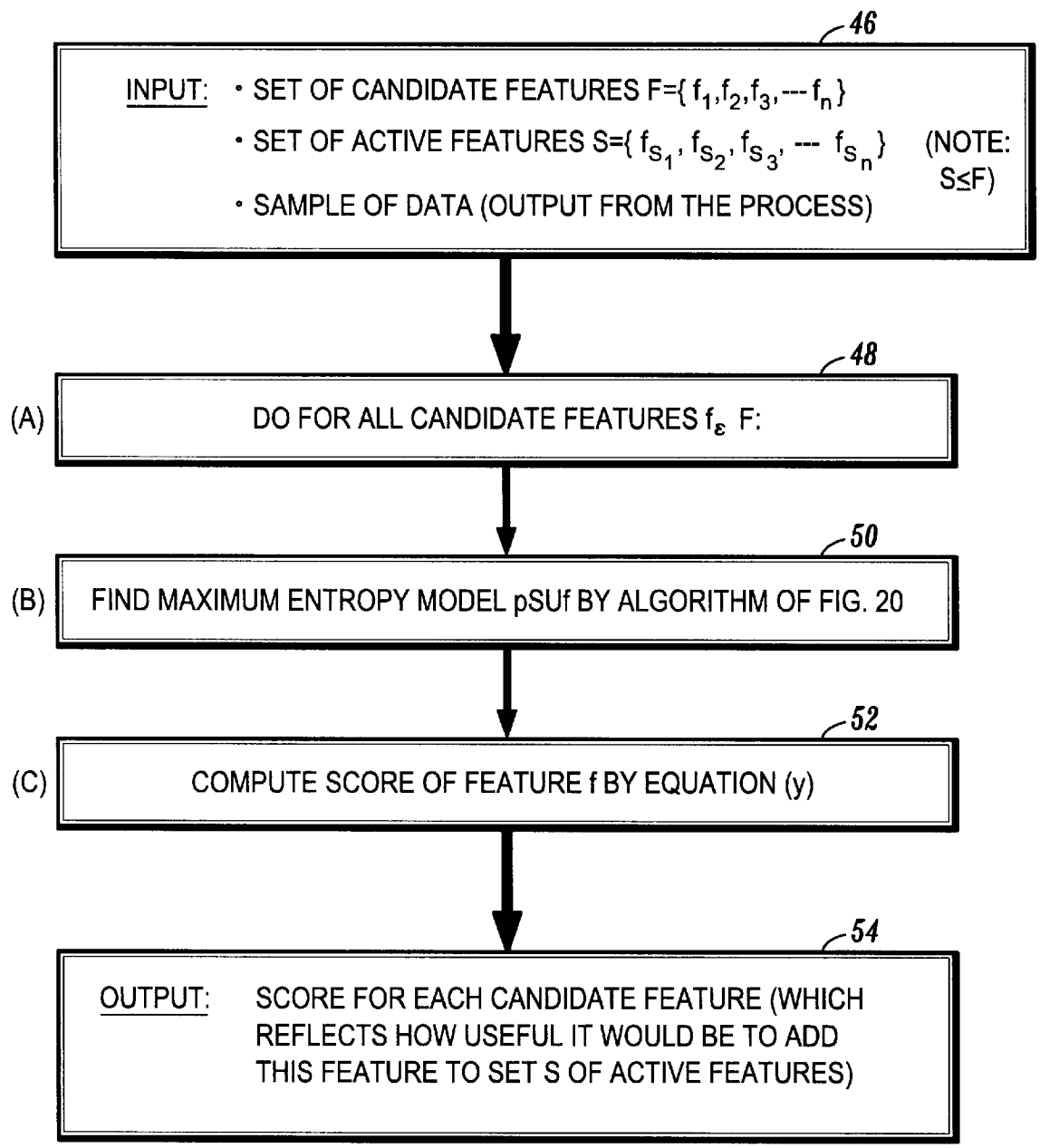
FIG. 16 is a detailed flow diagram of step (A) of FIG. 15.
Figure 17:
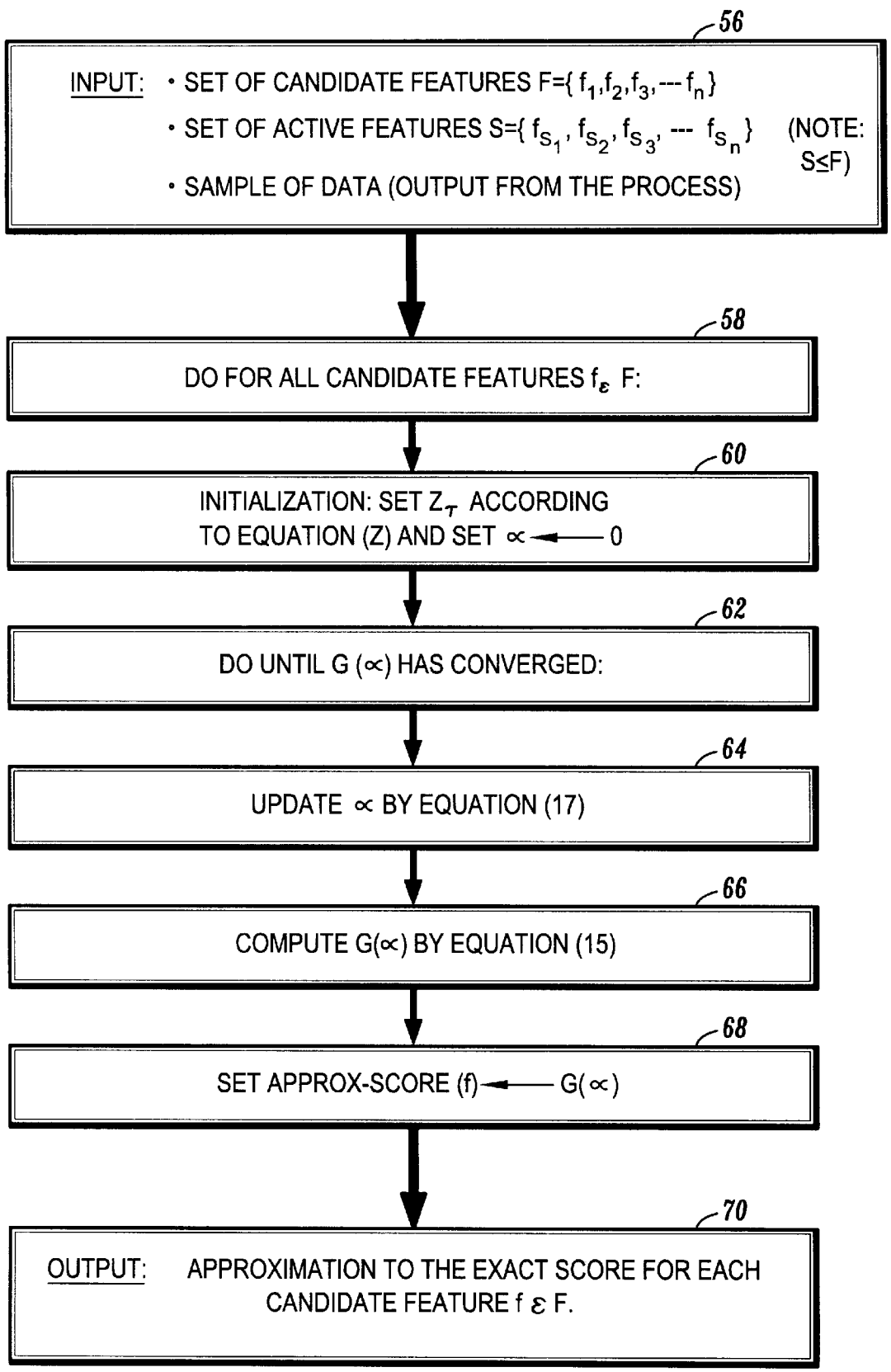
FIG. 17 is an alternative detailed flow diagram of step (A) of FIG. 15.
Figure 18:
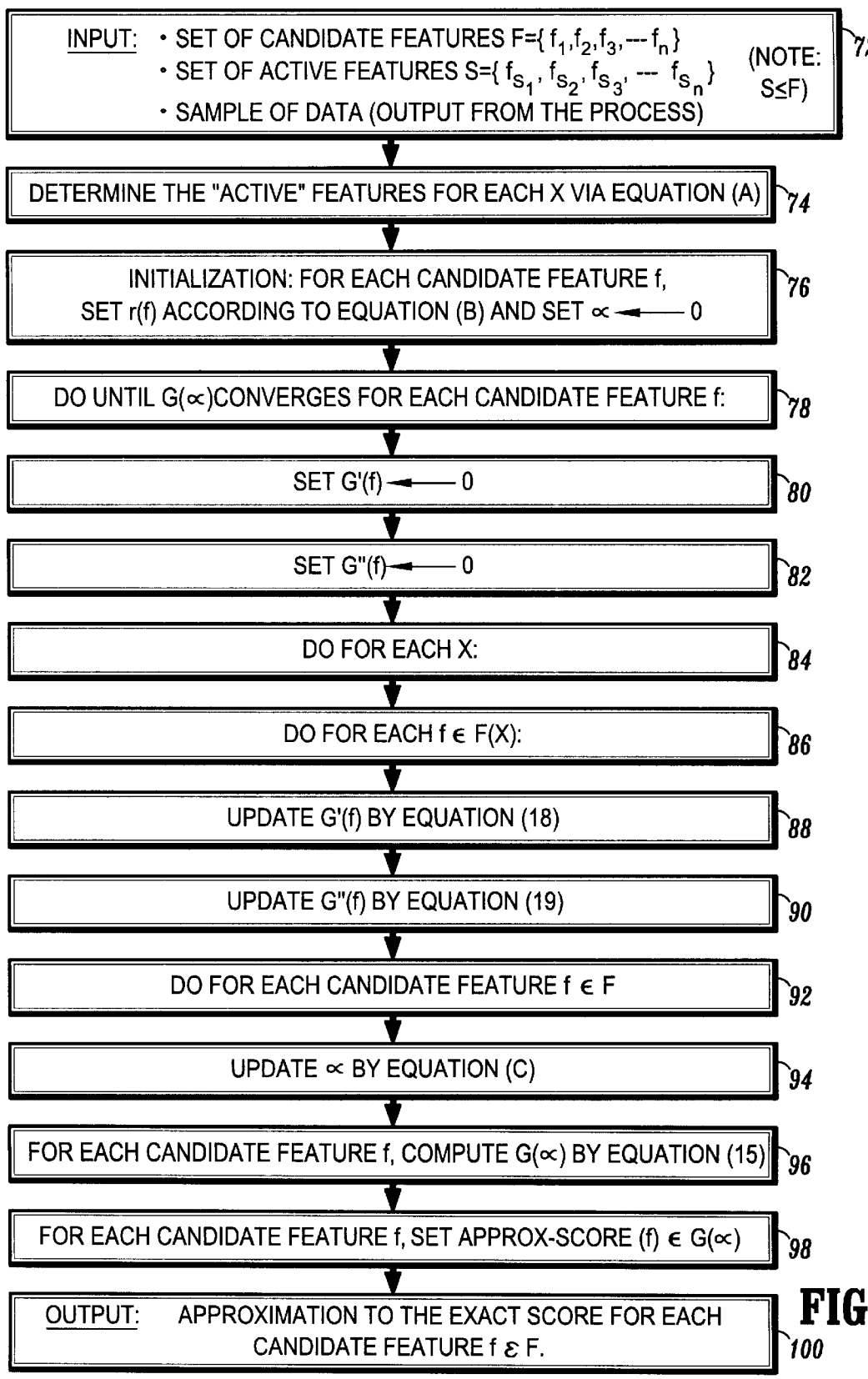
FIG. 18 is another alternative detailed flow diagram of step (A) of FIG. 15.

In alternative embodiments, each of FIGS. 16–18 describes one possible implementation of step 2 in FIG. 15 that is, assigning a score to each feature which reflects how useful it would be to add that feature.

Notes

We use "exponential model" and maximum entropy model" interchangeably in the diagrams and the present application.

As shown in FIG. 15, in an illustrative embodiment, the method of the present invention includes steps 28–44 for determining a model for use in a translation process. The step 32 of scoring all features is shown in greater detail in alternative embodiments in FIGS. 16–18 having steps 46–54, 56–70 and 72–100, respectively. Alternative to the method shown in FIG. 15, the method of the present invention may include steps 102–120 as shown in FIG. 19, in which step 106 may be embodied as any one of the alternative methods for scoring features as shown in FIGS. 16–18, respectively.

Figure 19:
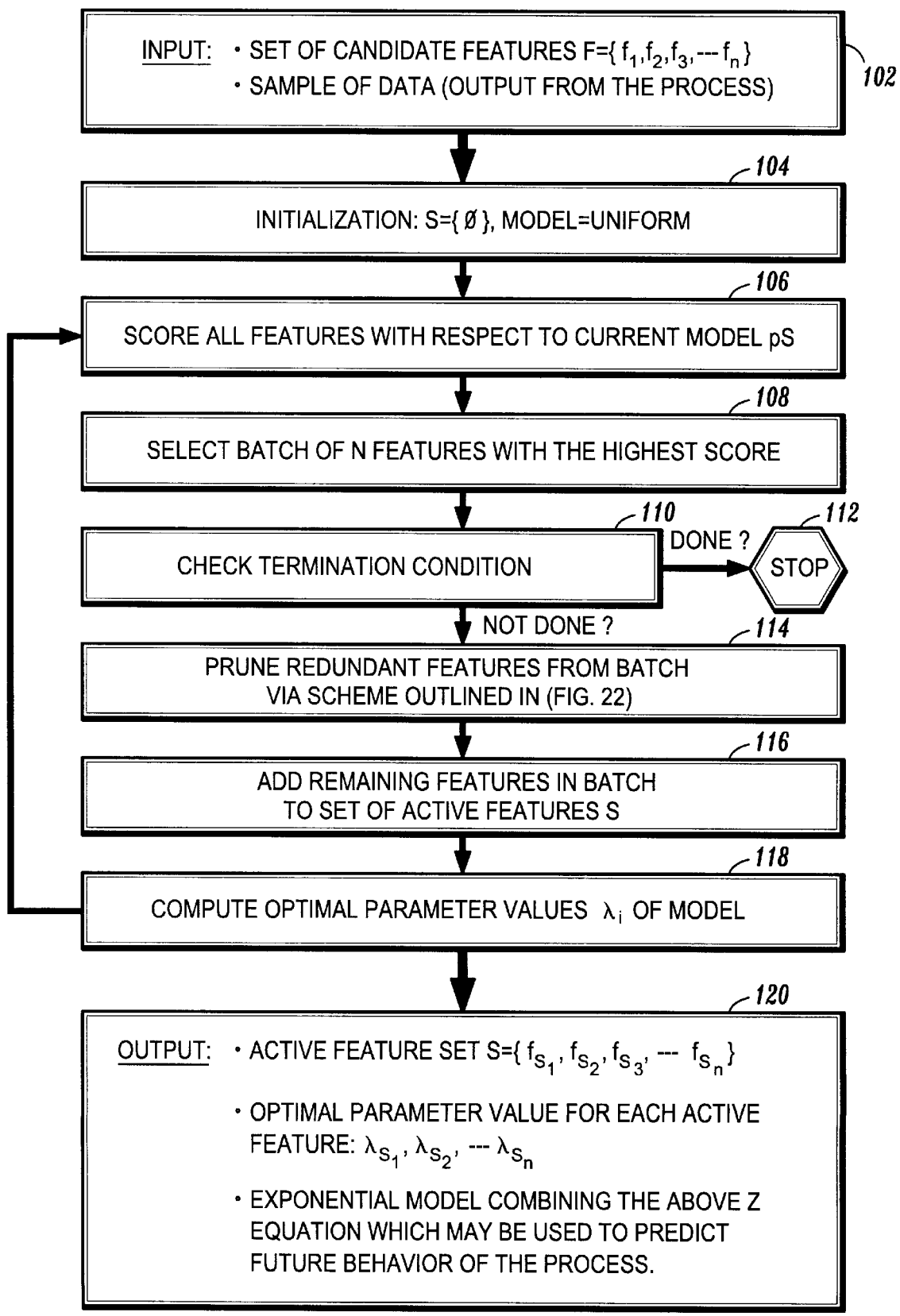
FIG. 19 is a flow diagram describing an alternative process for constructing an exponential model.
Figure 20:
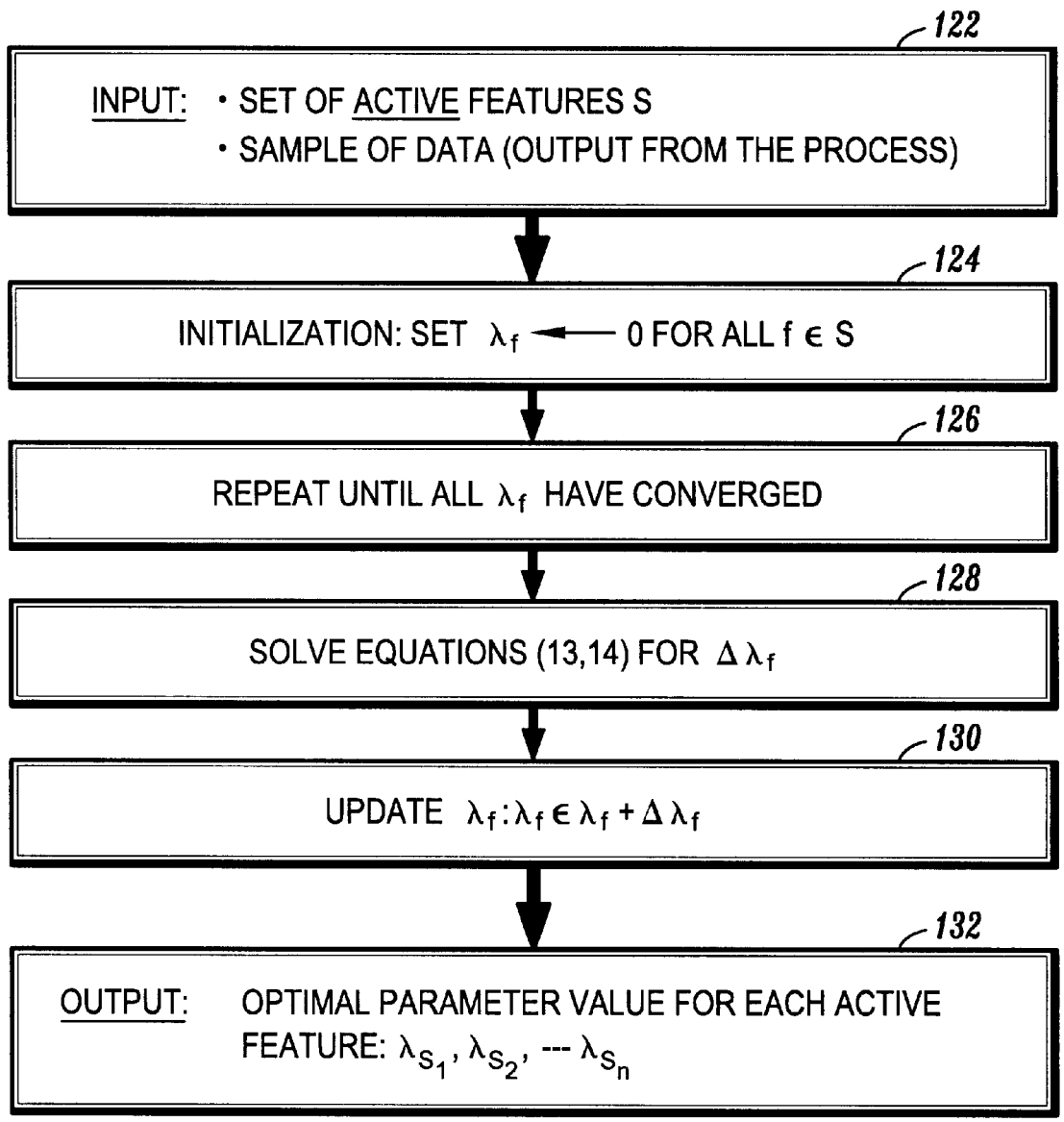
FIG. 20 is a detailed flow diagram of step (E) of FIG. 15.

Step 118 in FIG. 19 is shown in greater detail in FIG. 20, in which the computation of optimal parameters in step 118 includes steps 122–132 of FIG. 20.

Figure 21:
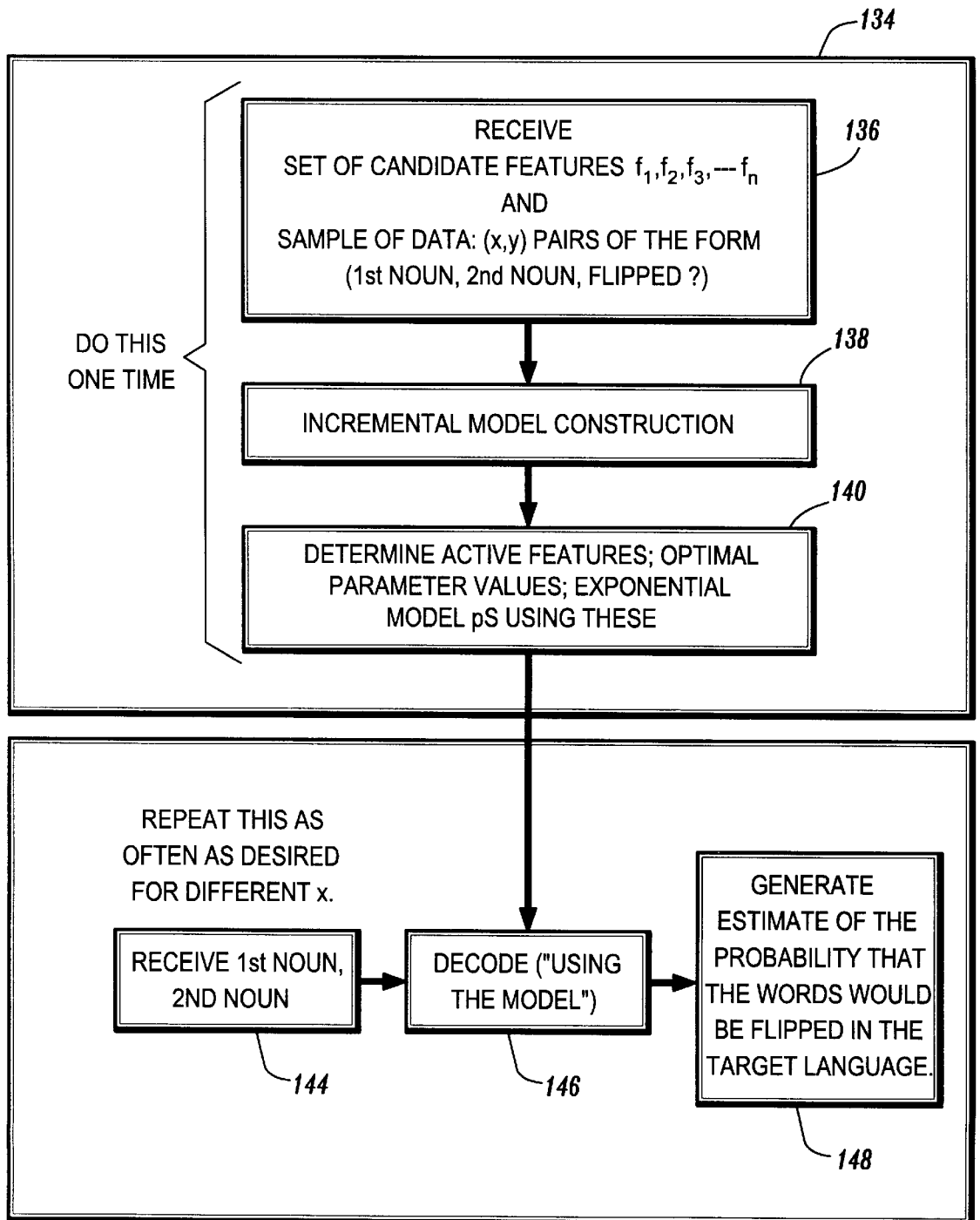
FIG. 21 illustrates an overview of the process for incremental construction of and usage of an exponential model to predict whether to reorder a French "noun-de-noun" phrase.

As shown in FIG. 21, the method of the present invention may be used in conjunction with the translation process to implement reordering of the translated words, in which the determination of the model occurs once in step 134, which includes steps 136–140, and the determination of the need to reorder the words occurs in step 142, having steps 144–148, which may be repeatedly executed. In particular, step 138 includes either of the methods shown in FIGS. 15 and 19.

Figure 22:
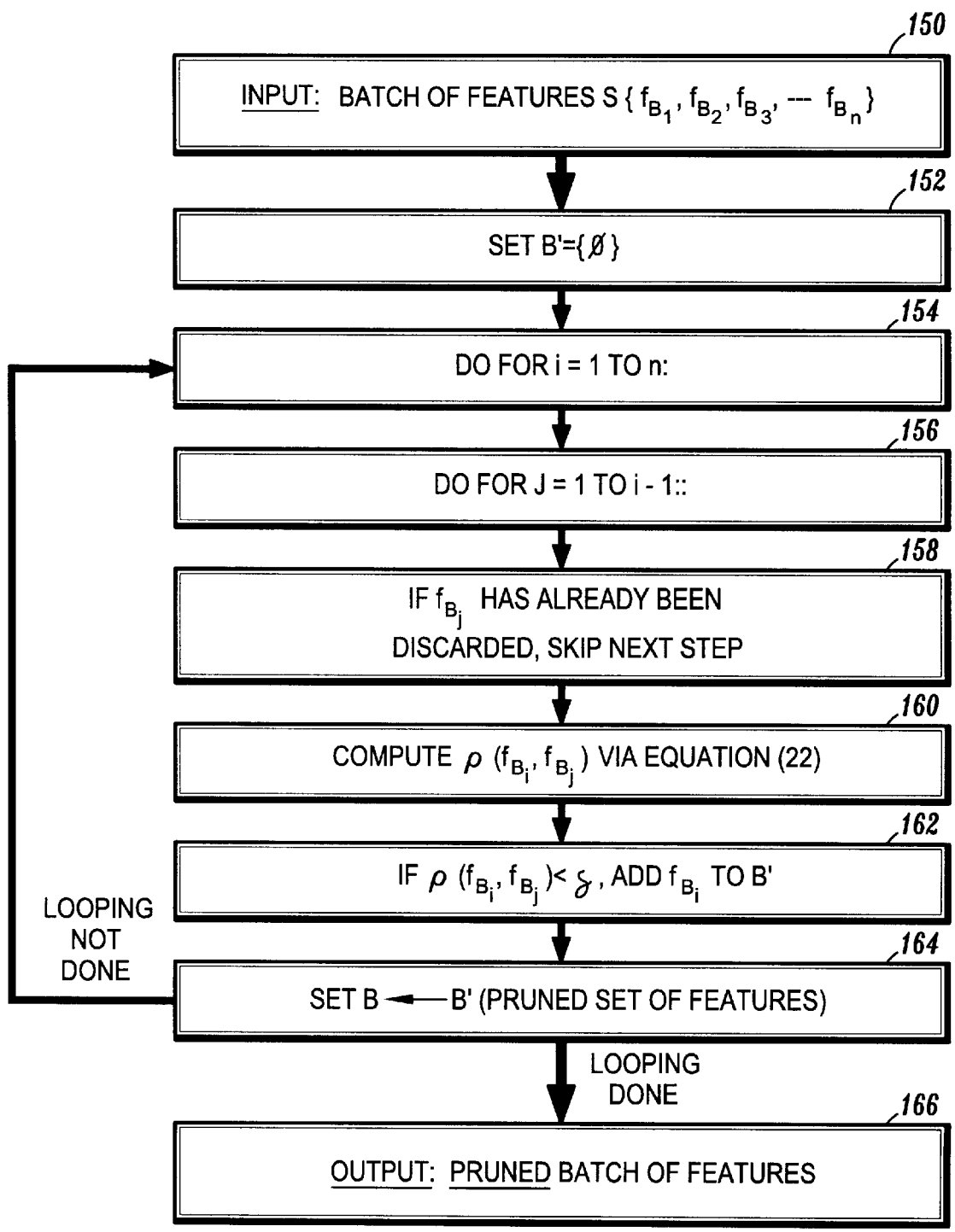
FIG. 22 is a detailed flow diagram of the step of pruning redundant features.

As shown in FIG. 22, the method of the present invention includes a method for pruning redundant features having steps 150–166, in which a batch of features is input in step 150, and the initial pruned batch of features is set to the empty set in step 152. For n features, in which n is the number of features in the original batch, the method loops in steps 154 and 156 to determine in a features has been discarded in step 158, then a redundancy value ρ is determined in step 160 by Equation (22). If the redundancy value ρ is less than δ, a predetermined threshold value, as determined by step 162, then the feature is added to the pruned batch B'. The new pruned batch is set to be the batch of features in step 164 for further processing by steps 154–162, and, after the looping and processing of all features is complete, the final batch is output in step 166.

What we claim as new, and wish to secure by Letters Patent, is:

1. A computer-implemented method for translating source words using a language translation process, the language translation process using an adjustable model, the method comprising the steps of:

choosing an initial model for the language translation process;

generating, responsive to the source words, an output corresponding to at least one target hypothesis using the language translation process and the initial model;

adjusting the initial model to generate an adjusted model, including the following steps (a)–(j):

(a) providing a set of candidate features exhibited in the output of the language translation process;

(b) providing a sample of data representing the output of the language translation process being modeled;

(c) generating an intermediate model from the initial model of the language translation process;

(d) initializing an active set S of features contained in the intermediate model;

(e) computing scores representing the benefit of adding features to the intermediate model;

(f) selecting one or more features having scores higher than a first given value;

(g) if none of the scores is higher than a second given value, stop;

(h) adding selected features to the set S of active features;

(i) computing a model Ps containing the features in S to be the intermediate model; and (j) repeating steps (e)–(i) until the stop condition of step (g) is satisfied to determine from the intermediate model an adjusted model; and translating the source words with the language translation process operating using the adjusted model.

2. The method of claim 1, further comprising:

after step (i), pruning the selected features to a smaller set to eliminate unhelpful features.

3. The method of claim 1, wherein the step of computing the score comprises:

for each candidate feature f, compute the best model containing the features in S and also the feature f; and computing the exact score of the feature the score representing how useful it would be to add this feature to S.

4. The method of claim 1, wherein the step of computing the score comprises computing for each feature (sequentially) an approximate score of the feature.

5. The method of claim 1, wherein approximate scores for all features are calculated in parallel.

6. The method of claim 1, wherein the step of computing Ps comprises:

initializing $\lambda_f = 0$ for all active features S;

repeating until all $\lambda_f$ have converged:

compute $\Delta\lambda_f$; and update $\lambda_f$ by $\Delta\lambda_f$.

7. A computer-implemented method for translating source words using a language translation process by constructing and adjusting a model for ordering a string of words in a source language prior to translation to a target language to make the ordering of the words in the source language consistent with conventional word ordering of the target language, comprising the steps of:

choosing an initial model for the language translation and reordering process;

generating, responsive to the source words, an output corresponding to at least one target hypothesis using the language translation and reordering process and the initial model;

adjusting the initial model to generate an adjusted model, including the following steps (a)–(j);
   a) providing a set of candidate features exhibited in sample word reorderings of strings of words in the source language;
   b) providing a sample of word reorderings of the strings of words in the source language;
   c) generating an intermediate model from the initial model of the language translation and reordering process;
   d) initializing the active set S of features contained in the intermediate model;
   e) computing scores representing the benefit of adding features to the intermediate model;
   f) selecting one or more features having scores higher than a first given value;
   g) if none of the scores is higher than a second given value, stop;
   h) adding selected features to the set S of active features;
   i) computing a model Ps containing the features in S to be the intemediate model; and
   j) repeating steps (e)–(i) until the stop condition of step (g) is satisfied to determine from the intermediate model an adjusted model; and translating the source words with the language translation process operating using the adjusted model.

8. The method according to claim 7, further comprising the step of inputting a string of words in the source language;

identifying groups of words that require reordering; and obtaining a score indicating whether reordering should be performed.

9. An apparatus for translating a series of source words in a first language to a series of target words in a second language different from the first language, said apparatus comprising:

means for inputting said series of source words;

means for generating at least two target hypotheses using a translation process model, each target hypothesis comprising said series of target words selected from a vocabulary of words in the second language, each target word having a context comprising at least one other word in the target hypothesis;

means for generating, for each target hypothesis, a language model match score associated with the translation process model comprising an estimate of the probability of occurrence of the series of words in the target hypothesis;

means for identifying at least one alignment between the input series of source words and each target hypothesis, the alignment connecting each source word with at least one target word in the target hypothesis;

means for generating, for each source word and each target hypothesis, a word match score comprising an estimate of the conditional probability of occurrence of the source word, given the target word in the target hypothesis which is connected to the source word and given the context of the target word in the target hypothesis which is connected to the source word;

means for generating, for each target hypothesis, a translation match score comprising a combination of the word match scores for the target hypothesis and the source words in the input series of source words;

means for generating a target hypothesis match score for each target hypothesis, each target hypothesis match score comprising a combination of the language model match score for the target hypothesis and the translation match score for the target hypothesis;

means for adjusting the translation process model; and means for outputting the target hypothesis having the best target hypothesis match score.

10. The apparatus of claim 9 wherein the means for adjusting the translation process model iteratively adjusts the translation process model by computing a score representing the benefit of adding at least one of a set of features to the translation process model and by generating an adjusted model having a highest score.

* * * * *